(12) United States Patent
Zheng et al.

(10) Patent No.: US 11,997,312 B2
(45) Date of Patent: May 28, 2024

(54) METHOD AND DEVICE FOR VIDEO IMAGE PROCESSING

(71) Applicant: SZ DJI TECHNOLOGY CO., LTD., Shenzhen (CN)

(72) Inventors: Xiaozhen Zheng, Shenzhen (CN); Suhong Wang, Beijing (CN); Shanshe Wang, Beijing (CN); Siwei Ma, Beijing (CN); Weiran Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 119 days.

(21) Appl. No.: 17/456,815

(22) Filed: Nov. 29, 2021

(65) Prior Publication Data

US 2022/0086483 A1 Mar. 17, 2022

Related U.S. Application Data

(63) Continuation of application No. 17/039,903, filed on Sep. 30, 2020, now Pat. No. 11,190,798, which is a (Continued)

(30) Foreign Application Priority Data

Apr. 2, 2018 (WO) ................ PCT/CN2018/081652
Jul. 13, 2018 (WO) ................ PCT/CN2018/095710
(Continued)

(51) Int. Cl.
*H04N 19/58* (2014.01)
*H04N 19/105* (2014.01)
(Continued)

(52) U.S. Cl.
CPC ........... *H04N 19/58* (2014.11); *H04N 19/105* (2014.11); *H04N 19/119* (2014.11);
(Continued)

(58) Field of Classification Search
CPC .... H04N 19/58; H04N 19/105; H04N 19/119; H04N 19/129; H04N 19/137;
(Continued)

(56) References Cited

U.S. PATENT DOCUMENTS 8,798,156 B2 8/2014 Jeon
9,497,481 B2 11/2016 Kitahara et al.
(Continued)

FOREIGN PATENT DOCUMENTS

CN 101573985 A 11/2009
CN 101873500 A 10/2010
(Continued)

OTHER PUBLICATIONS

"Algorithm description of Joint Exploration Test Model 7 (JEM7)", 119. MPEG Meeting, Torino; (Motion Picture Expert Group or ISO/IEC JTC1/SC29/WG11), No. n17055, Oct. 6, 2017.
(Continued)

*Primary Examiner* — Allen C Wong
(74) *Attorney, Agent, or Firm* — ANOVA LAW GROUP, PLLC

(57) ABSTRACT

A video encoding method including obtaining a motion vector candidate list of a current image block; determining a base motion vector according to motion vectors in the motion vector candidate list; in response to the base motion vector pointing to a short-term reference image, scaling a motion vector offset of the base motion vector using a scaling factor to obtain a scaled motion vector offset, and performing prediction for the current image block according to a motion vector determined by the scaled motion vector offset and the base motion vector; and in response to the base motion vector pointing to a long-term reference image, skipping scaling of the motion vector offset, and performing prediction for the current image block according to a motion
(Continued)

vector determined by the motion vector offset that is not scaled and the base motion vector.

20 Claims, 11 Drawing Sheets

Related U.S. Application Data continuation of application No. PCT/CN2019/078051, filed on Mar. 13, 2019.

(30) Foreign Application Priority Data

| Aug. 31, 2018 | (WO) | ................ PCT/CN2018/103693 |
| Sep. 25, 2018 | (WO) | ................ PCT/CN2018/107436 |
| Oct. 30, 2018 | (WO) | ................ PCT/CN2018/112805 |

(51) Int. Cl.
| H04N 19/119 | (2014.01) |
| H04N 19/129 | (2014.01) |
| H04N 19/137 | (2014.01) |
| H04N 19/139 | (2014.01) |
| H04N 19/176 | (2014.01) |
| H04N 19/30 | (2014.01) |
| H04N 19/513 | (2014.01) |
| H04N 19/56 | (2014.01) |
| H04N 19/573 | (2014.01) |
| H04N 19/96 | (2014.01) |

(52) U.S. Cl.
CPC ......... *H04N 19/129* (2014.11); *H04N 19/137* (2014.11); *H04N 19/139* (2014.11); *H04N 19/176* (2014.11); *H04N 19/30* (2014.11); *H04N 19/513* (2014.11); *H04N 19/56* (2014.11); *H04N 19/573* (2014.11); *H04N 19/96* (2014.11)

(58) Field of Classification Search
CPC .... H04N 19/139; H04N 19/176; H04N 19/30; H04N 19/513; H04N 19/56; H04N 19/573; H04N 19/96
USPC .................................................. 375/240.16
See application file for complete search history.

(56) References Cited

U.S. PATENT DOCUMENTS

| 9,979,959 | B2 | 5/2018 | Wang |
| 11,159,821 | B2 | 10/2021 | Zheng et al. |
| 11,330,294 | B2 | 5/2022 | Zheng et al. |
| 11,368,714 | B2 | 6/2022 | Zheng et al. |
| 2003/0206589 | A1 | 11/2003 | Jeon |
| 2004/0076237 | A1* | 4/2004 | Kadono ............... H04N 19/625 375/240.16 |
| 2004/0218674 | A1 | 11/2004 | Kondo et al. |
| 2005/0013498 | A1 | 1/2005 | Srinivasan et al. |
| 2006/0269153 | A1 | 11/2006 | Shi et al. |
| 2009/0116556 | A1 | 5/2009 | Ogawa |
| 2012/0128060 | A1 | 5/2012 | Lin et al. |
| 2012/0128071 | A1 | 5/2012 | Celetto et al. |
| 2012/0269270 | A1 | 10/2012 | Chen et al. |
| 2012/0320981 | A1 | 12/2012 | Shimada et al. |
| 2013/0107963 | A1 | 5/2013 | Wahadaniah et al. |
| 2013/0107964 | A1 | 5/2013 | Wahadaniah et al. |
| 2013/0107965 | A1 | 5/2013 | Wahadaniah et al. |
| 2013/0114742 | A1 | 5/2013 | Hannuksela et al. |
| 2014/0016701 | A1 | 1/2014 | Chen et al. |
| 2014/0098876 | A1 | 4/2014 | Jeon |
| 2014/0153641 | A1 | 6/2014 | Kim et al. |
| 2014/0169475 | A1 | 6/2014 | Zhang et al. |
| 2014/0233651 | A1 | 8/2014 | Nakamura et al. |
| 2014/0307783 | A1 | 10/2014 | Kim et al. |
| 2014/0307789 | A1 | 10/2014 | Kim et al. |
| 2014/0314147 | A1 | 10/2014 | Rusanovskyy et al. |
| 2014/0376638 | A1 | 12/2014 | Nakamura et al. |
| 2015/0085929 | A1 | 3/2015 | Chen et al. |
| 2015/0195558 | A1 | 7/2015 | Kim |
| 2015/0350684 | A1 | 12/2015 | Takahashi et al. |
| 2015/0373377 | A1 | 12/2015 | Wang et al. |
| 2016/0044324 | A1 | 2/2016 | Deshpande |
| 2016/0057439 | A1 | 2/2016 | Yamamoto et al. |
| 2016/0191928 | A1 | 6/2016 | Lee et al. |
| 2016/0191933 | A1 | 6/2016 | Ikai et al. |
| 2016/0241835 | A1 | 8/2016 | Kai et al. |
| 2016/0330472 | A1 | 11/2016 | Han et al. |
| 2017/0019666 | A1 | 1/2017 | Deshpande |
| 2017/0026655 | A1 | 1/2017 | Deshpande |
| 2017/0264893 | A1 | 9/2017 | Pandit et al. |
| 2017/0289566 | A1 | 10/2017 | He et al. |
| 2017/0332099 | A1 | 11/2017 | Lee et al. |
| 2017/0347128 | A1 | 11/2017 | Panusopone et al. |
| 2018/0052986 | A1 | 2/2018 | Stolbikov et al. |
| 2018/0184093 | A1 | 6/2018 | Xu et al. |
| 2018/0199055 | A1 | 7/2018 | Sun et al. |
| 2018/0199057 | A1 | 7/2018 | Chuang et al. |
| 2018/0316918 | A1 | 11/2018 | Drugeon et al. |
| 2018/0376161 | A1 | 12/2018 | Chen et al. |
| 2019/0058895 | A1 | 2/2019 | Deshpande |
| 2019/0110061 | A1 | 4/2019 | Park et al. |
| 2019/0141320 | A1 | 5/2019 | Wang et al. |
| 2019/0182504 | A1* | 6/2019 | Lainema ................ H04N 19/56 |
| 2019/0342557 | A1 | 11/2019 | Robert et al. |
| 2020/0029092 | A1 | 1/2020 | Rath et al. |
| 2020/0053361 | A1 | 2/2020 | Robert et al. |
| 2020/0120344 | A1 | 4/2020 | Mao et al. |
| 2020/0296414 | A1 | 9/2020 | Park et al. |
| 2021/0021813 | A1 | 1/2021 | Lee |
| 2021/0021818 | A1* | 1/2021 | Lee ....................... H04N 19/132 |
| 2021/0021860 | A1 | 1/2021 | Jang et al. |
| 2021/0168360 | A1 | 6/2021 | Hendry et al. |

FOREIGN PATENT DOCUMENTS

| CN | 102447904 | A | 5/2012 |
| CN | 102611881 | A | 7/2012 |
| CN | 102883161 | A | 1/2013 |
| CN | 103190151 | A | 7/2013 |
| CN | 103299636 | A | 9/2013 |
| CN | 103329537 | A | 9/2013 |
| CN | 103636218 | A | 3/2014 |
| CN | 103748879 | A | 4/2014 |
| CN | 104488272 | A | 4/2015 |
| CN | 104796724 | A | 7/2015 |
| CN | 104811727 | A | 7/2015 |
| CN | 106375770 | A | 2/2017 |
| CN | 106534858 | A | 3/2017 |
| CN | 107071477 | A | 8/2017 |
| CN | 107105281 | A | 8/2017 |
| CN | 107181959 | A | 9/2017 |
| CN | 107534778 | A | 1/2018 |
| CN | 107682705 | A | 2/2018 |
| CN | 107820095 | A | 3/2018 |
| EP | 2763416 | A1 | 8/2014 |
| EP | 2863631 | A1 | 4/2015 |
| EP | 3200461 | A1 | 8/2017 |
| IN | 7657CHENP2011 | | 6/2013 |
| JP | 2013223049 | A | 10/2013 |
| JP | 2013545342 | A | 12/2013 |
| JP | 2014514811 | A | 6/2014 |
| JP | 2014535239 | A | 12/2014 |
| JP | 2015525547 | A | 9/2015 |
| JP | 2016537839 | A | 12/2016 |
| JP | 2017537529 | A | 12/2017 |
| JP | 2019506089 | A | 2/2019 |
| JP | 2020145486 | A | 9/2020 |
| JP | 2021517798 | A | 7/2021 |
| JP | 2021520119 | A | 8/2021 |
| KR | 20170078672 | A | 7/2017 |
| KR | 2019003825 | W | 4/2019 |
| WO | 2012011672 | A2 | 1/2012 |

(56) References Cited

FOREIGN PATENT DOCUMENTS

| WO | 2012128540 A  | 9/2012 |
| WO | 2013061546 A1 | 5/2013 |
| WO | 2017133243 A1 | 8/2017 |
| WO | 2017157281 A1 | 9/2017 |
| WO | 2018052986 A1 | 3/2018 |
| WO | 2019054736 A1 | 3/2019 |

OTHER PUBLICATIONS

Xiu X et al: "Description of SDR, HDR and 360° video coding technology proposal by InterDigital Communications and Dolby Laboratories", 10. JVET Meeting, No. JVET-J0015, Apr. 3, 2018.
Li (Panasonic) J et al: "AHG5: Reduction of worst case memory bandwidth", 124. MPEG Meeting, No. m44131, Oct. 5, 2018.
"Series H: Audiovisual and Multimedia Systems Infrastructure of audio visual services—Coding of moving video", H.265 (Apr. 2013), High efficiency video coding, ITU-T, Jun. 7, 2013.
The World Intellectual Property Organization (WIPO) International Search Report for PCT/CN2019/078051 dated May 22, 2019 4 Pages (including translation).
The World Intellectual Property Organization (WIPO) International Search Report for PCT/CN2018/081652 dated Jan. 8, 2019 6 Pages (including translation).
The World Intellectual Property Organization (WIPO) International Search Report for PCT/CN2018/095710 dated Dec. 29, 2018 8 Pages (including translation).
The World Intellectual Property Organization (WIPO) International Search Report for PCT/CN2018/103693 dated May 31, 2019 6 Pages (including translation).
The World Intellectual Property Organization (WIPO) International Search Report for PCT/CN2018/107436 dated Nov. 30, 2018 4 Pages (including translation).
The World Intellectual Property Organization (WIPO) International Search Report for PCT/CN2018/112805 dated Jan. 30, 2019 10 Pages (including translation).
Bernd Girod, Motlon-Compensating Prediction With Fractional-Pel Accuracy, IEEE Transactions on Communications, Apr. 1993, pp. 604-612, vol. 41 , No. 4.
Xiaoyu xie.et al, CE4.2.5:Simpllficattonson advanced temporal motion vector wedtchon(ATMVP), Jomt Vldeo Experts Team(JVET) of ITU-T SG 16 WP 3 and ISO/IEC JTC 1/SC 29/WG 11, Jul. 2018.
Hyeongmun Jang, et al , ICE4-2.6 Simplified ATMVP, Joint Video Experts Team (JVET)of ITU-T SG 16 WP 3 and ISO/IEC JTC 1/SC 29/WG 11 , Jul. 2018.
Krasten Suehning VVC reference software, VTM-2.0, Fraunhofer HHI, 2019 https : vcgit.hhi.fraunhofer. de/jvet/VVCSoftware_VTM/-/treeIVTM-2.0.
Takahashi Y et al: "High-level Syntax: Motion vector prediction issue for long-term reference picture", 10. JCT-VC Meeting; 101. MPEG Meeting; Nov. 7, 2012-Jul. 20, 2012; No. JCTVC-J0071, Jun. 29, 2012.
Chen Fangdonget al: "Block-Composed Background Reference for High Efficiency Video Coding", IEEE Transactions on Circuits and Systems for Video Technology, IEEE, USA, vol. 27, No. 12, Dec. 1, 2017, pp. 2639-2651.
Chen J et al: "Algorithm description of Joint Exploration Test Model 7 (JEM7)", No. G1001_v1; JVET-G1001, Aug. 19, 2017, pp. 1-48.
Seungsoo Jeong et al: "CE4 Ultimate motion vector expression in JVET-J0024 (Test 4.2.9)", No. JVET-K0115_v4; JVET-K0115, Jul. 12, 2018, pp. 1-7.
Alshin A et al: "Description of SDR, HDR and 360° video coding technology proposal by Samsung, Huawei, GoPro, and HiSilicon—mobile application scenario", No. m42354, Apr. 14, 2018.

* cited by examiner

METHOD AND DEVICE FOR VIDEO IMAGE PROCESSING

CROSS-REFERENCE TO RELATED APPLICATIONS

This application is a continuation of application Ser. No. 17/039,903, filed Sep. 30, 2020, now U.S. Pat. No. 11,190,798, which is a continuation of International Application No. PCT/CN2019/078051, filed Mar. 13, 2019, which claims priority to International Application No. PCT/CN2018/112805, filed Oct. 30, 2018, International Application No. PCT/CN2018/107436, filed Sep. 25, 2018, International Application No. PCT/CN2018/103693, filed Aug. 31, 2018, International Application No. PCT/CN2018/095710, filed Jul. 13, 2018, and International Application No. PCT/CN2018/081652, filed Apr. 2, 2018, the entire contents of all of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of video encoding and decoding, and in particular to a method and device for video image processing.

BACKGROUND

At present, the main video coding standards adopt block-based motion compensation technology in inter prediction. The main principle is to find the most similar block in an encoded image for a current image block. This process is called motion compensation. For example, an image is first divided into coding tree units (CTUs) of equal size, such as the size of 64×64 or 128×128. Each CTU can be further divided into square or rectangular coding units (CUs). For each CU, the most similar block is searched in a reference frame (generally a re-composite frame near a current frame in the time domain) as a prediction block of the current CU. A relative displacement between the current block (that is, the current CU) and the similar block (that is, the prediction block of the current CU) is referred to as a motion vector (MV). The process of finding the most similar block in the reference frame as the prediction block of the current block is motion compensation.

In the current technology, a motion vector candidate list of the current CU is usually constructed according to two manners, and the motion vector candidate list is also called a Merge candidate list. The motion vector candidate list includes candidate motion vectors in a spatial domain, and the motion vector (or motion information) of encoded neighboring blocks of the current CU is usually filled into the motion vector candidate list. The motion vector candidate list also includes candidate motion vectors in the time domain. Temporal Motion Vector Prediction (TMVP) uses the motion vector (or motion information) of a co-located CU, i.e., a CU at a corresponding position in a neighboring encoded image of the current CU. An optimal motion vector candidate is selected from the Merge candidate list as the motion vector of the current CU and a prediction block of the current CU is determined according to the motion vector of the current CU.

Advanced/alternative temporal motion vector prediction (ATMVP) is a motion vector prediction mechanism. The basic principle of ATMVP technology is to perform motion compensation by obtaining motion information of multiple sub-blocks in the current CU. ATMVP technology introduces motion information of multiple sub-blocks in the current CU as candidates in constructing a candidate list (such as a Merge candidate list or an advanced motion vector prediction (AMVP) candidate list). The ATMVP technology includes two steps. The first step is to determine a time-domain vector by scanning the motion vector candidate list of the current CU or the motion vector of the neighboring image block of the current CU, and the second step is to divide the current CU into N×N (by default, N is 4) sub-blocks (sub-CU), determine a corresponding block of each sub-block in the reference frame according to the obtained time-domain vector, and determine the motion vector of each sub-block according to the motion vector of the corresponding block of each sub-block in the reference frame.

In the first step of the current ATMVP technology, the process of determining a time-domain vector by scanning the candidate list of the current CU or the motion vector of the neighboring image block of the current CU can be improved. In the second step of the current ATMVP technology, the size of the sub-CU can be adaptively set at the frame level, and the default size is 4×4. When a certain preset condition is met, the size of the sub-CU can be set to 8×8. The size setting of the sub-CU has some problems of not matching a storage granularity (8×8) of the current motion information. ATMVP technology and TMVP technology have redundant operations in some scenarios, and the process of constructing the candidate motion vector list can be improved.

SUMMARY

In accordance with the disclosure, there is provided a video image processing method including dividing a coding tree unit into one or more coding units using a quadtree plus binary tree division method, obtaining a motion vector candidate list of one of the one or more coding units, determining a base motion vector according to motion vectors in the motion vector candidate list, in response to the base motion vector pointing to a short-term reference image, scaling the base motion vector using a scaling factor not equal to 1, in response to the base motion vector pointing to a long-term reference image, scaling the base motion vector using a scaling factor set to 1, and performing prediction for the one of the one or more coding units according to the base motion vector after being scaled.

Also in accordance with the disclosure, there is provided a video image processing device including a memory storing computer executable instructions and a processor configured to execute the instructions to divide a coding tree unit into one or more coding units using a quadtree plus binary tree division method, obtain a motion vector candidate list of one of the one or more coding units, determine a base motion vector according to motion vectors in the motion vector candidate list, in response to the base motion vector pointing to a short-term reference image, scale the base motion vector using a scaling factor not equal to 1, in response to the base motion vector pointing to a long-term reference image, scale the base motion vector using a scaling factor set to 1, and perform prediction for the one of the one or more coding units according to the base motion vector after being scaled.

DETAILED DESCRIPTION OF THE EMBODIMENTS

Figure 1:
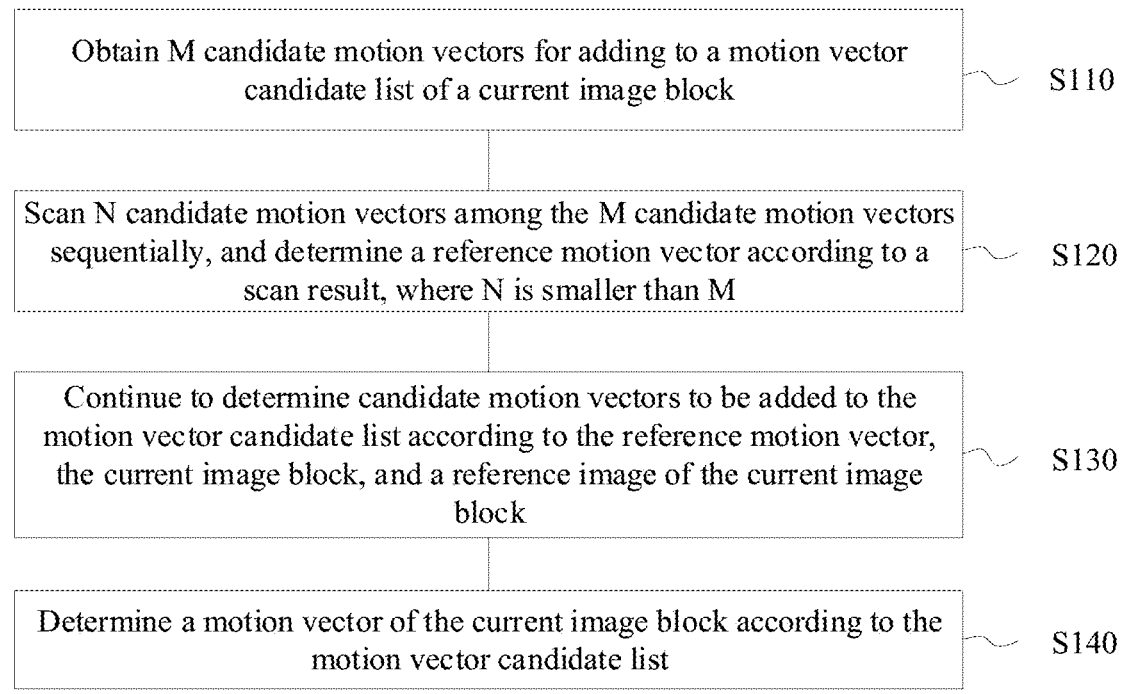
FIG. 1 is a schematic flowchart of a video image processing method according to an embodiment of the disclosure.

The technical solutions in the embodiments of the present disclosure are described below with reference to the accompanying drawings.

Unless otherwise defined, all technical and scientific terms used in the disclosure have the same meaning as commonly understood by those of ordinary skill in the art. The terminology used in the specification of the present disclosure is for the purpose of describing specific embodiments only and is not intended to limit the present disclosure.

In video encoding and decoding, the prediction process is used to reduce redundant information in the image. A prediction block refers to a basic unit used for prediction in a frame of image. In some standards, the prediction block is also called a prediction unit (PU). Before a frame of image is encoded/compressed, the image is divided into multiple image blocks, and further, each image block of the multiple image blocks may be further divided into multiple image blocks, and so on. In different coding methods, the number of division levels can be different, and the operation methods can also be different. In different coding standards, the names of image blocks on the same level may be different. For example, in some video standards, each of the multiple image blocks that a frame of image is divided into for the first time is called a coding tree unit (CTU), a coding tree unit may include a coding unit (CU) or may be further divided into multiple coding units, e.g., using a quadtree plus binary tree division method, and a coding unit may be divided into one, two, four or other numbers of prediction units according to the prediction mode. In some video standards, the coding tree unit is also referred to as a largest coding unit (LCU).

Prediction refers to finding image data similar to the prediction block, which is also called a reference block of the prediction block. By encoding/compressing the difference between the prediction block and the reference block of the prediction block, the redundant information in the encoding/compression is reduced. The difference between the prediction block and the reference block may be a residual obtained by subtracting a corresponding pixel value of the prediction block and the reference block. Prediction includes intra prediction and inter prediction. Intra prediction refers to searching the reference block of the prediction block in the frame where the prediction block is located, and inter prediction refers to searching the reference block of the prediction block in other frames except the frame where the prediction block is located.

In some video standards, the prediction unit is the smallest unit in an image, and the prediction unit is not further divided into multiple image blocks. An "image block" or a "current image block" mentioned below refers to a prediction unit (or a coding unit), and an image block can be further divided into multiple sub-blocks, and each sub-block can be further used for prediction.

In this disclosure, before a prediction is performed on the current image block, a motion vector candidate list is constructed, and the prediction is performed on the current image block based on the candidate motion vector selected from the motion vector candidate list. The motion vector candidate list has multiple types of modes. The multiple types of modes of the motion vector candidate list are described as follows.

In the first type of mode, for example, at the encoding end, after the motion vector candidate list is constructed, the current image block may be encoded by the following processes.

1) Select an optimal motion vector (denoted as MV1) from the motion vector candidate list, use the selected MV1 as the motion vector of the current image block, and obtain an index of the MV1 in the motion vector candidate list.

2) Determine a predicted image block of the current image block from the reference image (i.e., reference frame) according to the motion vector MV1 of the current image block. That is, a position of the predicted image block of the current image block in the reference frame is determined.

3) Obtain a residual between the current image block and the predicted image block.

4) Send the index of the motion vector MV1 of the current image block in the motion vector candidate list and the obtained residual to the decoding end.

For example, at the decoding end, the current image block can be decoded by the following processes.

1) Receive the residual and the index of the motion vector of the current image block in the motion vector candidate list from the encoding end.

2) Obtain a motion vector candidate list through the method according to the embodiments of the present disclosure, where the motion vector candidate list obtained by the decoding end is consistent with the motion vector candidate list obtained by the encoding end.

3) Obtain the motion vector MV1 of the current image block from the motion vector candidate list according to the index.

4) Obtain the predicted image block of the current image block, and then combine the residuals to obtain the current image block by decoding according to the motion vector MV1.

That is, in the first type of mode, the motion vector of the current image block is equal to a motion vector prediction (MVP). In some standards, this first type of mode is also called a Merge mode.

In the second type of mode, the difference from the first type of mode is that after the encoding end selects a best motion vector MV1 from the motion vector candidate list, the MV1 is also used as a search starting point to perform a motion search, and a displacement between a position of a final search result and the search starting point is used as a motion vector difference (MVD). Then, according to a motion vector MV1+MVD of the current image block, a predicted image block of the current image block is determined from the reference image. The encoding end also sends the MVD to the decoding end. In some standards, this second type of mode is also referred to as AMVP mode (i.e., normal inter prediction mode).

The construction methods of the motion vector candidate lists in different types of modes may be the same or different. The motion vector candidate list constructed in the same way may only be applicable to one type of mode, or may be applicable to different types of construction modes, which is not limited here.

This disclosure provides motion vector candidate lists constructed in two modes. For the convenience of description, the motion vector candidate lists constructed in two modes are referred to as a first motion vector candidate list and a second motion vector candidate list in the following. One difference between the two lists is that at least one candidate in the first motion vector candidate list includes a motion vector of a sub-block, and each candidate in the second motion vector candidate list includes a motion vector of an image block. As mentioned above, the image block and the current image block are the same type of concept, and both refer to a prediction unit (or a coding unit), and the sub-block refers to one of multiple sub-blocks obtained by dividing the image block. When a candidate in the first motion vector candidate list is used for prediction, a reference block of the current image block is determined according to the candidate, and then a residual of the image block and the reference block is calculated. When a candidate in the second motion vector candidate list is used for prediction, if the candidate used is a motion vector of a sub-block, a reference block of each sub-block of the current image block is determined according to the candidate, a residual of each sub-block of the current image block and its reference block is calculated, and the residuals of various sub-blocks are combined to form the residual of the current image block.

When candidates in the first motion vector candidate list and/or the second motion vector candidate list are being determined, one of the candidates may be determined according to the ATMVP technology. In some embodiments, when the first motion vector candidate list is constructed, the motion vectors determined according to the ATMVP technology may be added to the list as the first candidate. In some embodiments, when the second motion vector candidate list is constructed, and after candidates are added to the second motion vector candidate list according to the motion vectors of a preset number of spatial neighboring blocks at preset positions of the current image block, a motion vector determined according to the ATMVP technology may be added to the list as a candidate. The order of adding the candidates of the two candidate lists can be another order, which is not limited here.

The following is an example of how to determine one of the candidates according to the ATMVP technology based on the method of constructing the second motion vector candidate list.

In describing the construction of the second motion vector candidate list, motion vectors are explained first to facilitate understanding of the following description. A motion vector of an image block may include information of an image pointed to by the motion vector and a displacement. The motion vector of an image block means one image block in the image pointed to by the motion vector that has the displacement relative to the image block. For an encoded/decoded image block, the motion vector means a reference image of the encoded/decoded image block, and a displacement of a reference block of the encoded/decoded image block relative to the encoded/decoded image block. The reference block of an image block mentioned in this disclosure refers to an image block used to calculate residuals of the image block.

FIG. 1 is a schematic flowchart of a video image processing method according to an embodiment of the present disclosure. The method includes following processes.

At S110, M candidate motion vectors for adding to a second motion vector candidate list of a current image block are obtained.

The current image block is an image block to be encoded (or decoded). An image frame where the current image block is located is referred to as a current frame. For example, the current image block is a coding unit (CU).

For example, the second motion vector candidate list of the current image block may be a Merge candidate list or an AMVP candidate list. For example, the second motion vector candidate list may be a normal motion vector candidate list (Normal Merge List) among Merge candidate lists. The second motion vector candidate list may also have another name.

The M candidate motion vectors may be determined according to motion vectors of M neighboring blocks of the current image block in the current frame. The neighboring block may be an image block adjacent or having a certain distance to the current image block in the current frame. The M neighboring blocks are image blocks in the current frame that have been encoded (or decoded).

Figure 2:
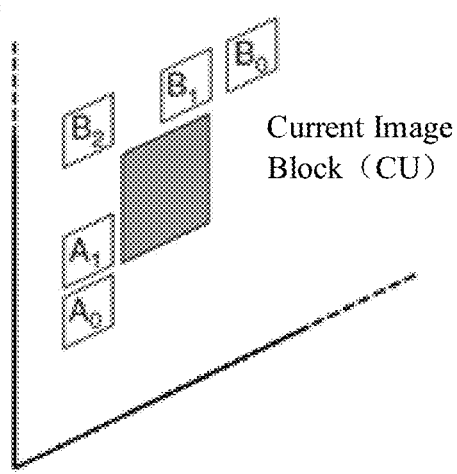
FIG. 2 is a schematic diagram showing obtaining a candidate motion vector of a current block through a neighboring block of a current image block.

For example, as shown in FIG. 2, the M neighboring blocks of the current image block are the image blocks at four locations $A_1$ (left)→$B_1$ (top)→$B_0$ (upper right)→$A_0$ (lower left) around the current image block. The M (that is, M equals 4) candidate motion vectors of the current image block are determined according to the motion vectors of the image blocks at these four locations.

Further, when an unavailable neighboring block exists in the M neighboring blocks, or a neighboring block that uses an intra-coding mode exists in the M neighboring blocks, the motion vector of the unavailable neighboring block or the neighboring block that uses the intra-coding mode is not available. Therefore, the motion vector of the unavailable neighboring block is not used as a candidate motion vector, and the unavailable motion vector is not added to the second motion vector candidate list of the current image block.

In some embodiments, after the process of S110 is completed, the M candidate motion vectors are added to the second motion vector candidate list. At S120, the second motion vector candidate list may be directly scanned.

At S120, N candidate motion vectors among the M candidate motion vectors are scanned sequentially, and a reference motion vector is determined according to a scan result, where N is smaller than M, and M and N are both natural numbers.

No matter whether all of the M candidate motion vectors are added to the second motion vector candidate list, or only some candidate motion vectors among the M candidate motion vectors are added to the second motion vector candidate list because some candidate motion vectors among the M candidate motion vectors are unavailable, N candidate motion vectors among the M candidate motion vectors are always scanned sequentially. Always scanning the N candidate motion vectors among the M candidate motion vectors sequentially may refer to always scanning the candidate motion vectors that have been added to the candidate motion vector list among the N candidate motion vectors, or refer to always scanning the N candidate motion vectors that have been added to the candidate motion vector list among the M candidate motion vectors.

Determining the reference motion vector according to the scan result of the N candidate motion vectors may include checking the N candidate motion vectors sequentially based on a preset condition and determining the reference motion vector according to the checking result.

For example, the preset condition includes that the image block can obtain or not use the intra prediction mode, and a reference frame pointed to by the candidate motion vector is the same as a reference image of the current image block.

The reference image of the current image block is a reference image with a shortest temporal distance to the image where the current image block is located, or the reference image of the current image block is a reference image preset at the encoding and decoding ends, or the reference image of the current image block is a reference image specified in a video parameter set, a sequence header, a sequence parameter set, an image header, an image parameter set, or a slice header.

For example, the reference image of the current image block is a collocated frame of the current image block, and the collocated frame is a frame set in a slice-level information header for obtaining motion information for prediction. In some application scenarios, the collocated frame is also referred to as a collocated picture.

According to the evolution of future technology, the preset condition may be given other different definitions, and the corresponding solution also falls within the scope of the present disclosure.

The process of determining the reference motion vector according to the scan result of N candidate motion vectors is described in detail below.

At S120, only N motion vectors among the M candidate motion vectors that are obtained in the process of S110 are scanned, which can reduce the number of scans.

In some embodiments, at S120, the first N candidate motion vectors among the M candidate motion vectors may be sequentially scanned.

In some embodiments, at S120, the last N candidate motion vectors among the M candidate motion vectors may be sequentially scanned, or, the middle N candidate motion vectors among the M candidate motion vectors may be sequentially scanned, which is not limited in the disclosure.

For one example, at S120, some of the candidate motion vectors among the M candidate motion vectors are sequentially scanned.

For another example, at S120, some of the candidate motion vectors among the candidate motion vectors that are currently added to the second motion vector candidate list are sequentially scanned.

At S130, candidate motion vectors to be added to the second motion vector candidate list are continued to be determined according to the reference motion vector, the current image block, and the reference image of the current image block. That is, additional candidate motion vectors to be added to the second motion vector candidate list can be determined according to the reference motion vector, the current image block, and the reference image of the current image block.

The second motion vector candidate list of the current image block includes the M candidate motion vectors determined in process S110 and the candidate motion vectors determined in process S130. In one example, after the (M+1)th candidate motion vector to be added to the second motion vector candidate list is determined according to the process S130, other candidate motion vectors to be added to the second motion vector candidate list are also continued to be determined according to other methods, which is not limited here.

After the second motion vector candidate list is constructed, as shown in FIG. 1, the method further includes determining a motion vector of the current image block according to the second motion vector candidate list obtained at S130 (S140).

The solution provided in this disclosure can be applied to the ATMVP technology. In the first step of the ATMVP technology, a time-domain vector of the current image block is obtained by scanning all candidate motion vectors that are currently added in the second motion vector candidate list. For example, the second motion vector candidate list is usually filled with 4 spatial-domain candidate motion vectors, hence all the 4 candidate motion vectors may need to be scanned to obtain the time-domain vector of the current image block.

In some embodiments, in the process of obtaining the reference motion vector of the current image block, only N (N is smaller than M) candidate motion vectors among the M candidate motion vectors that have been obtained are sequentially scanned. Comparing with the existing technology, the number of scans of the candidate motion vectors in the process of obtaining the reference motion vector of the current image block can be reduced. Applying the solution provided by the present disclosure to the first step of the ATMVP technology can simplify the redundant operations.

An official test sequence of the latest reference software VTM-2.0 of versatile video coding is selected as the test sequence. The test configuration is RA configuration and LDB configuration. The solution provided by this disclosure is tested and the test result shows that the performance gain of ATMVP technology can still be maintained after the number of scans is reduced.

Therefore, the solution provided in this disclosure can reduce the complexity of the ATMVP technology while maintaining the performance gain of the ATMVP technology.

The second motion vector candidate list formed according to the construction method provided by this disclosure may be applied to the encoding end or the decoding end. In other words, the execution entity of the method provided by the present disclosure may be the encoding end or the decoding end.

For example, the second motion vector candidate list formed by the construction solution provided in this disclosure can be applied to the above-described first type of mode (e.g., Merge mode).

In some embodiments, at S110, according to the motion vectors of the 4 neighboring blocks of the current image block in the current frame, the 4 candidate motion vectors to be added to the second motion vector candidate list of the current image block are determined. That is, M is equal to 4. At S120, N candidate motion vectors among the 4 candidate motion vectors are scanned, and N is smaller than 4.

For example, N is equal to 1. At S120, only the first motion vector candidate in the second motion vector candidate list is scanned. For another example, N is equal to 2 or 3.

The method for determining the reference motion vector of the current image block according to the scan result of the N candidate motion vectors at S120 is described below.

At S120, it is determined one by one whether the N candidate motion vectors among the M candidate motion vectors satisfy the preset condition, and the reference motion vector is determined according to the determination result. In some embodiments, the preset condition is that the reference frame pointed to by the candidate motion vector is the same as the reference image of the current image block.

In some embodiments, at S120, the N candidate motion vectors are sequentially scanned. When a first candidate motion vector that meets the preset condition is determined, that is, when a first candidate motion vector that points to a reference frame same as the collocated frame of the current frame is determined, the scanning is stopped, and the reference motion vector is determined according to the first scanned candidate motion vector that meets the preset condition.

When the first candidate motion vector meeting the preset condition is scanned, the number of scans may be equal to N, or smaller than N. For example, when the candidate motion vector of the first scan satisfies the preset condition, the scanning is stopped, and this candidate motion vector is used as the reference motion vector of the current image block.

In some embodiments, at S120, when no candidate motion vector meeting the preset condition is found among the N candidate motion vectors, that is, when the reference frames pointed to by the N candidate motion vectors are all different from the collocated frame of the current image block, a default value is used as the value of the reference motion vector.

For example, the default value is (0, 0), that is, the reference motion vector is (0, 0). According to actual scenarios, the default value may have other definitions.

In some embodiments, at S120, when no candidate motion vector meeting the preset condition is found among the N candidate motion vectors, that is, when the reference frames pointed to by the N candidate motion vectors are all different from the collocated frame of the current image block, a specific candidate motion vector in the second motion vector candidate list is scaled, and the reference motion vector is determined according to the scaled specific candidate motion vector.

The specific candidate motion vector may be the first motion vector or the last motion vector obtained according to the scanning order among the N candidate motion vectors.

The specific candidate motion vector may also be a motion vector obtained in other scanning order among the N candidate motion vectors.

When the preset condition is that the reference frame pointed to by the candidate motion vector is the same as the reference frame of the current image block, the specific candidate motion vector in the second motion vector candidate list is scaled. Determining the reference motion vector according to the scaled specific candidate motion vector includes scaling the specific candidate motion vector in the second motion vector candidate list, so that the reference frame pointed to by the scaled specific candidate motion vector is the same as the reference image of the current image block, and using the scaled specific candidate motion vector as the reference motion vector.

Figure 3:
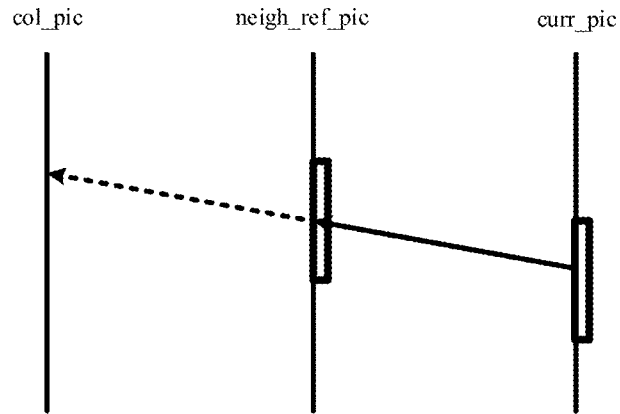
FIG. 3 is a schematic diagram showing scaling a candidate motion vector.

As shown in FIG. 3, curr_pic represents the image where the current image block is located, col_pic represents the collocated frame of the current image block, and neigh_ref pic represents the reference frame pointed to by the specific candidate motion vector. In some embodiments, a scaling factor of the specific motion vector is determined according to a temporal distance between the reference image neigh_ref pic pointed to by the specific candidate motion vector and the image curr_pic where the image block corresponding to the specific motion vector is located, and a temporal distance between the reference image col_pic of the current image block and the image curr_pic where the current image block is located.

The difference in the motion intensity between one image frame and another image frame is poor. In the scenario with intense motion between the current frame and its collocated frame, if the motion vector (0, 0) is used as the basis for locating the corresponding block of the current block, the movement between frames is not considered and the absolute coordinates of the current block in the collocated frame are directly assumed to have not changed, and in fact there is a high probability that the coordinates of the current block in the collocated frame are different from the coordinates of the current block in the current frame. Therefore, a large deviation may occur.

In the embodiments of the present disclosure, when no candidate motion vector whose reference frame is the same as the collocated frame of the current frame is found among the N candidate motion vectors, one candidate motion vector among the N candidate motion vectors is scaled to make the reference frame the same as the collocated frame of the current frame, and then the scaled candidate motion vector is used as the motion vector of the current image block. In this way, the accuracy of the motion vector of the current image block can be improved.

In some embodiments, when N is an integer smaller than M and greater than 1, the specific candidate motion vector in the embodiments may be a candidate motion vector that has a shortest temporal distance between the reference frame and the collocated frame of the current image block among the N candidate motion vectors.

Selecting a candidate motion vector with the shortest distance between the reference frame and the collocated frame of the current frame among the N candidate motion vectors to scale can reduce the time for scaling processing, thereby improving the efficiency of obtaining the motion vector of the current image block.

In some embodiments, when N is an integer smaller than M and greater than 1, the specific candidate motion vector in the embodiments may also be any candidate motion vector among the N candidate motion vectors.

When N is equal to 1, the specific candidate motion vector in the embodiments is the scanned candidate motion vector.

In some embodiments, N is equal to 1. At S120, a reference motion vector of the current image block is obtained by scanning one candidate motion vector in the second motion vector candidate list. When the scanned candidate motion vector points to a reference frame that is different from the collocated frame of the current frame where the current image block is located, the candidate motion vector is scaled so that the reference frame of the scaled candidate motion vector is the same as the collocated frame of the current frame, and the scaled candidate motion vector is used as the reference motion vector of the current image block. When the reference frame of the scanned candidate motion vector is the same as the collocated frame of the current frame, the candidate motion vector is used as the motion vector of the current image block.

In some embodiments, the motion vector of the current image block is obtained by scanning one candidate motion vector in the candidate motion vector list, the number of times of scanning the candidate motion vector in the process of obtaining the motion vector of the current image block is effectively reduced. When the reference frame of the scanned candidate motion vector is different from the collocated frame of the current frame, the candidate motion vector is scaled to make the reference frame the same as the collocated frame of the current frame, and then the scaled candidate motion vector is used as the motion vector of the current image block. In this way, the accuracy of the motion vector of the current image block can be improved. Therefore, compared with the existing technology, the solution provided by the embodiments of the present disclosure not only can simplify the process of determining the motion vector of the current image block, but also can improve the accuracy of the motion vector of the current image block.

When the preset condition changes, the process of scaling the specific candidate motion vector in the second motion vector candidate list also needs to be changed accordingly, that is, to ensure that the scaled specific candidate motion vector satisfies the preset condition.

The process of determining candidate motion vectors to be added to the second motion vector candidate list according to the reference motion vector, the current image block, and the reference image of the current image block at S130 is described below.

In some embodiments, determining candidate motion vectors to be added to the second motion vector candidate list according to the reference motion vector, the current image block, and the reference image of the current image block includes dividing the current image block into multiple sub-blocks, determining a related block of the sub-block in the reference image of the current image block according to the reference motion vector, and determining the candidate motion vector to be added to the second motion vector candidate list according to the motion vector of the related block.

For example, the motion vector of the related block of each sub-block in the current image block is added as a candidate to the second motion vector candidate list. When the candidate is used for prediction, the motion vector of the related block of each sub-block in the current image block is used for prediction of the sub-block.

For example, a representative motion vector of the related block of the current image block is added as a candidate to the second motion vector candidate list, and the candidate is identified as determined according to the ATMVP technology. When the candidate is used for prediction, the related block of the current image block is determined according to the identifier and the candidate, and the current image block and the related block are divided into multiple sub-blocks in the same way. Sub-blocks in the current image block correspond to sub-blocks in the related block in a one-to-one correspondence. Various sub-blocks in the current image block are respectively predicted according to the motion vectors of various corresponding sub-blocks in the related block. In some embodiments, when a sub-block with an unavailable motion vector exists in the related block, the representative motion vector of the related block is used to replace the unavailable motion vector to predict the corresponding sub-block in the current image block. In some embodiments, when a sub-block with an unavailable motion vector exists in the related block and no representative motion vector of the related block is available, the candidate determined according to the ATMVP technology is not added to the second motion vector candidate list. For example, when the sub-block in the related block is not available, or the sub-block in the related block uses the intra-coding mode, it is determined that there exists a sub-block with an unavailable motion vector in the related block.

In some embodiments, the representative motion vector of the related block of the current image block may refer to a motion vector at a center position of the related block, or another motion vector representing the related block, which is not limited here.

In some video encoding/decoding standards, the related block may be referred to as a collocated block or corresponding block.

For example, the current image block is a CU, and the sub-block obtained after dividing the CU may be referred to as a sub-CU. In some embodiments, the size of the sub-block and/or the size of the related block of the sub-block is fixed to be greater than or equal to 64 pixels. In some embodiments, the size of the sub-block and/or the size of the related block of the sub-block are both fixed at 8×8 pixels.

In the ATMVP technology, the size of the sub-block can be adaptively set at the frame level. The size of the sub-block is 4×4 by default. When a certain condition is met, the size of the sub-block is set to 8×8. For example, at the encoding end, when the current image block is encoded, the average block size of each sub-block in the CU is calculated when the last encoded image block in the same time-domain layer is encoded in ATMVP mode. When the average block size is greater than a threshold, the size of the sub-block of the current image block is set to 8×8, otherwise the default value of 4×4 is used. At present, in a new generation of the versatile video coding standard (VVC), the motion vector is stored with a size of 8×8. When the size of the sub-block is set to 4×4, the size of the motion vector of the sub-block (also 4×4) does not meet the storage granularity of the motion vector in the current standard. In addition, in the ATMVP technology, when the current image block is encoded, information about the size of the sub-block of the previous encoded image block in the same time-domain layer needs to be stored.

In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

At present, in the TMVP technology, the MV of the collocated CU at the lower right corner or center of the current CU in the neighboring encoded image is scaled to obtain the temporal candidate motion vector of the current CU. In other words, TMVP realizes MVP by traversing encoded blocks at two fixed positions in the reference image. The order is TB→TC, and the first traversed MV is directly used as the MVP of TMVP. In the embodiments of the present disclosure, the size of the sub-block in the ATMVP technology is set to 8×8. An MV in a merge candidate list (merge list) of the various embodiments of this disclosure is used to locate the related block. The located MV of the related block is used as the MVP of ATMVP.

In some versions of the video standard VVC, constructing the merge lists includes first constructing the merge candidate list of ATMVP and then constructing the merge candidate list of TMVP. In some other versions of the video standard VVC, the merge candidate list of TMVP is constructed in a process of constructing the merge list, and the merge candidate list of ATMVP is constructed in a process of constructing an affine merge list. ATMVP and TMVP construct two different lists, but in principle, there is no need to add the same MV or the same set of MVs to both merge candidate lists. In the scenario in which the width and height of the current CU are both equal to 8, the merge candidate lists constructed separately by TMVP and ATMVP may have some redundancy, that is, the two technologies may derive the same set of temporal candidate motion information for the current CU.

In some embodiments of the present disclosure, when the width and height of the current CU are both equal to 8, it is set not to perform the TMVP operation. In other words, when the size of the sub-block and/or the size of the related block of the sub-block is 8×8 pixels, it is set not to perform the TMVP operation. As a result, it can be avoided that the merge candidate lists constructed by ATMVP and TMVP include the same MV or the same set of MVs, and some redundant operations can be skipped. Therefore, the encoding and decoding time is effectively saved and the coding efficiency is improved.

In some embodiments of the present disclosure, when the width and/or height of the current CU is smaller than 8 pixels, it is set not to perform the TMVP operation. In other words, when at least one of the width or height of the sub-block and/or the related block of the sub-block is smaller than 8 pixels, it is set not to perform the TMVP operation. This is because the hardware design of the encoder and/or decoder requires the same size of processing area to complete the encoding or decoding in the same time. However, for areas including relatively many small blocks, the running time of encoding or decoding will be much longer than that of other areas. Further, when the width and height of the sub-block and/or the related block of the sub-block are both smaller than 8 pixels, it is set not to perform the TMVP operation. Therefore, saving the running time of small block encoding or decoding is very meaningful for hardware parallel processing. Further, the use of time-domain correlation is increased in the current encoding technology, and many time-domain prediction technologies have been adopted, such as the ATMVP technology. Therefore, for small blocks, the performance impact of skipping TMVP operations can be ignored, the encoding and decoding time is effectively saved, and the coding efficiency is improved.

On the premise that the size of the sub-block and/or the related block of the sub-block is fixed to be equal to 64 pixels, the size of the sub-block and/or the related block of the sub-block may also be other dimensions, for example, the size of the sub-block and/or the size of the related block of the sub-block is A×B, where A≤64, B≤64, and A and B are both multiples of 4. For example, the size of the sub-block and/or the size of the related block of the sub-block is 4×16 pixels, or 16×4 pixels.

In some embodiments, according to the reference motion vector, the current image block, and the reference image of the current image block, determining the candidate motion vector to be added to the second motion vector candidate list includes determining the related block of the current image block in the reference image of the current image block according to the reference motion vector, and determining the candidate motion vector to be added to the second motion vector candidate list according to the motion vector of the related block.

In the encoding/decoding technology, the encoded/decoded image is generally used as the reference image of the current image to be encoded/decoded. In some embodiments, a reference image may also be constructed to improve the similarity between the reference image and the current image to be encoded/decoded.

For example, there is a specific type of encoding/decoding scene in the video content, in which the background basically does not change and only the foreground in the video changes or moves. For example, video surveillance belongs to this type of scene. In video surveillance scenes, the surveillance camera is usually fixed or only moves slowly, and it can be considered that the background basically does not change. In contrast, objects such as people or cars photographed by the video surveillance cameras often move or change, and it can be considered that the foreground changes frequently. In such scenes, a specific reference image can be constructed, and the specific reference image contains only high-quality background information. The specific reference image may include multiple image blocks, and any one image block is taken from a decoded image. Different image blocks in the specific reference image may be taken from different decoded images. When inter prediction is being performed, the specific reference image can be referred to for the background part of the current image to be encoded/decoded, thereby reducing residual information of inter prediction and improving encoding/decoding efficiency.

The above is a specific example for a specific reference image. In some embodiments, the specific reference image has at least one of the following properties: composite frame, long-term reference image, or image not for outputting. The image not for outputting refers to an image that is not output for displaying. Generally, the image not for outputting exists as a reference image to other images. For example, the specific reference image may be a composite long-term reference image, or may be a composite frame that is not output, or may be a long-term reference image that is not output, and so on. In some embodiments, the composite frame is also referred to as a composite reference frame.

In some embodiments, the non-specific reference image may be a reference image that does not have at least one of the following properties: composite frame, long-term reference image, or image not for outputting. For example, the non-specific reference image may include a reference image other than a composite frame, or include a reference image other than a long-term reference image, or include a reference image other than an image not for outputting, or include a reference image other than a composite long-term reference image, or include a reference image other than a composite frame that is not output, or include a reference image other than a long-term reference image that is not output, and so on.

In some embodiments, when the image in the video can be used as a reference image, the image can be a long-term reference image or a short-term reference image. The short-term reference image is a concept corresponding to the long-term reference image and the short-term reference image exists in the reference image buffer for a period of time. After the operation of moving a decoded reference image after the short-term reference image in and out of the reference image buffer is performed for a number of times, the short-term reference image is removed from the reference image buffer. The reference image buffer may also be referred to as a reference image list buffer, a reference image list, a reference frame list buffer, or a reference frame list, etc., which are all referred to as a reference image buffer in this disclosure.

The long-term reference image (or part of the data in the long-term reference image) can always exist in the reference image buffer, and the long-term reference image (or part of the data in the long-term reference image) is not affected by the decoded reference image moving in and out of the reference image buffer. The long-term reference image (or part of the data in the long-term reference image) is only removed from the reference image buffer when the decoding end sends an update instruction.

The short-term reference image and the long-term reference image may be called differently in different standards. For example, in standards such as H.264/advanced video coding (AVC) or H.265/HEVC, the short-term reference image is called a short-term reference frame, and the long-term reference image is called a long-term reference frame. For another example, in standards such as audio video coding standards (AVS) 1-P2, AVS2-P2, and Institute of Electrical and Electronics Engineers (IEEE) 1857.9-P4, the long-term reference image is called a background picture. As another example, in standards such as VP8 and VP9, the long-term reference image is called a golden frame.

The specific terminology used in the embodiments of the present disclosure does not mean that it must be applied to a specific scene. For example, referring to a long-term reference image as a long-term reference frame does not mean that the technologies corresponding to the standards of H.264/AVC or H.265/HEVC must be applied.

The long-term reference image described above may be obtained by constructing image blocks extracted from multiple decoded images, or updating existing reference frames (for example, pre-stored reference frames) using multiple decoded images. The composite specific reference image may also be a short-term reference image. Or, the long-term reference image may not be the composite reference image.

In the above embodiments, the specific reference image may include a long-term reference image, and the non-specific reference image may include a short-term reference image.

In some embodiments, the type of the reference frame can be identified by a special field in the stream structure.

In some embodiments, when the reference image is determined to be a long-term reference image, the reference image is determined to be a specific reference image. When the reference image is determined to be a frame that is not output, the reference image is determined to be a specific reference image. When the reference image is determined to be a composite frame, the reference image is determined to be a specific reference image. When the reference image is determined to be a frame that is not output and the reference image is further determined to be a composite frame, the reference image is determined to be a specific reference image.

In some embodiments, various types of reference images may have corresponding identifiers. At this time, for the decoding end, it may be determined whether the reference image is a specific reference image according to the identifier of the reference image.

In some embodiments, when it is determined that the reference image has the identifier of the long-term reference image, the reference image is determined to be a specific reference image.

In some embodiments, when it is determined that the reference image has an identifier that is not output, it is determined that the reference image is a specific reference image.

In some embodiments, when it is determined that the reference image has an identifier of the composite frame, the reference image is determined to be a specific reference image.

In some embodiments, when it is determined that the reference image has at least two of the following three identifiers: the identifier of the long-term reference image, the identifier that is not output, the identifier of the constructed frame or the composite reference frame, the reference image is determined to be a specific reference image. For example, when it is determined that the reference image has an identifier that is not output, and it is determined that the reference image has an identifier of the composite frame, the reference image is determined to be a specific reference image.

In some embodiments, the image may have an identifier indicating whether it is a frame to be output. When an image is indicated to be not output, the frame is indicated to be a reference image. Further, it is determined whether the frame has an identifier of the composite frame. When the frame has the identifier of the composite frame, the reference image is determined to be a specific reference image. If an image is indicated to be output, the frame is directly determined to not be a specific reference image without determining whether it is a composite frame. Or, if an image is indicated to be not output, but has an identifier indicating it is not a composite frame, the frame can be determined to not be a specific reference image.

In some embodiments, the reference image can be determined to be a specific reference image when it is determined that the reference image meets one of the following conditions by analyzing parameters from a picture header, a picture parameter set, or a slice header: the reference image is a long-term reference image, the reference image is a composite reference image, and the reference image is an image not for outputting, or the reference image is an image not for outputting and is further determined to be a composite reference image.

In some embodiments, the process of determining the motion vector of the current image block involves using a motion vector of a certain image block on another image to determine the motion vector of the image block. For convenience of description, the image block is referred to as a first image block, and the certain image block on another image to be used is referred to as a time-domain reference block or a related block of the first image block. The first image block and the time-domain reference block (or the related block) of the first image block are located on different images. Then, in the process of determining the motion vector of the first image block using the motion vector of the time-domain reference block (or the related block), the motion vector of the time-domain reference block (or the related block) needs to be scaled. For convenience of description, the term "related block" is used in the disclosure.

For example, when the ATMVP technology is applied in constructing the AMVP candidate list, and when the motion vector of the related block of the current image block is determined according to the ATMVP technology, the motion vector of the related block needs to be scaled, and then motion vector of the current image block is determined according to the scaled motion vector. Generally speaking, a scaling factor of the motion vector of the related block is determined based on a temporal distance between the reference image pointed to by the motion vector of related block and the image where the related block is located, and a temporal distance between the reference image of the current image block and the image where the current image block is located.

In one example, the motion vector of the related block is referred to as MV 2, and the index value of the reference frame of the reference image pointed to by the motion vector MV 2 is x. The index value x of the reference frame is the difference between the sequence number of the reference image pointed to by MV 2 (for example, POC) and the sequence number of the image where the related block is located. The index value of the reference frame of the reference image of the first image block is y. The index value y of the reference frame is the difference between the sequence number of the reference image of the first image block and the sequence number of the image where the first image block is located. Then, the scaling factor of the motion vector MV 2 is y/x. In some embodiments, the product of the motion vector MV 2 and y/x may be used as the motion vector of the first image block.

However, when the motion vector MV 2 of the related block points to a specific reference image, or when the reference image of the first image block is a specific reference image, because the definition of the temporal distance between the specific reference image and the image where the first image block is located is not clear, it may be meaningless to scale the motion vector MV 2 of the related block.

In some embodiments, when the motion vector of the current image block is determined according to the motion vector of the related block, and when the motion vector of the related block points to a specific reference image, or the reference image of the current image block is a specific reference image, the motion vector of the current image block is determined according to a processed motion vector of the related block. The processed motion vector of the related block is the same as the motion vector of the related block before processing.

For example, the processed motion vector of the related block includes a motion vector obtained by scaling the motion vector of the related block according to a scaling factor of 1, or a motion vector of the related block skipping the scaling process.

In some embodiments, when the motion vector of the current image block is determined according to the motion vector of the related block, and when the motion vector of the related block points to a specific reference image, or when the reference image of the current image block is a specific reference image, the motion vector of the current image block is determined without referencing to the motion vector of the related block.

In some embodiments, at S120, if no candidate motion vector that meets a preset condition is found among the N candidate motion vectors, a specific candidate motion vector in the second motion vector candidate list is scaled, and then a reference motion vector is determined according to the scaled specific candidate motion vector. In some embodiments, the method further includes, when the specific candidate motion vector points to the specific reference image, or when the reference image of the current image block is the specific reference image, determining the candidate motion vector to be added to the second motion vector candidate list according to the processed specific candidate motion vector. The processed specific candidate motion vector is the same as the specific candidate motion vector before processing.

The processed motion vector of the related block includes a motion vector obtained by scaling the motion vector of the related block according to a scaling factor of 1, or a motion vector of the related block skipping the scaling process.

In some embodiments, at S120, if no candidate motion vector that meets the preset condition is found among the N candidate motion vectors, a specific candidate motion vector in the second motion vector candidate list is scaled, and then a reference motion vector is determined according to the scaled specific candidate motion vector. In some embodiments, the method further includes, when the specific candidate motion vector points to the specific reference image, or when the reference image of the current image block is the specific reference image, determining the candidate motion vector to be added to the second motion vectors candidate list without referencing to the specific candidate motion vector.

In the embodiments of the present disclosure, in the process of obtaining the reference motion vector of the current image block, only N (N is smaller than M) candidate motion vectors among the M candidate motion vectors that have been obtained are sequentially scanned. Comparing with the existing technology, the number of scans of the candidate motion vectors in the process of obtaining the reference motion vector of the current image block can be reduced. Applying the solution provided by the present disclosure to the first step of the ATMVP technology can simplify the redundant operations.

When no candidate motion vector whose reference frame is the same as the collocated frame of the current frame is found among the N candidate motion vectors, one candidate motion vector among the N candidate motion vectors is scaled to make the reference frame the same as the collocated frame of the current frame, and then the scaled candidate motion vector is used as the motion vector of the current image block. In this way, the accuracy of the motion vector of the current image block can be improved.

Dividing the current image block into multiple sub-blocks with a size of 8×8 can adapt to the storage granularity of the motion vector specified in the video standard VVC on the one hand, and on the other hand, there is no need to store the information of the size of the sub-block of the last encoded image block, therefore, the storage space is saved.

In some embodiments of the present disclosure, when the size of the sub-block and/or the size of the related block of the sub-block is 8×8 pixels, it is set not to perform the TMVP operation. Some of the redundant operation can be skipped, the encoding and decoding time can be effectively saved, and the coding efficiency can be improved.

In some embodiments of the present disclosure, when the width and/or height of the current CU is smaller than 8 pixels, it is set not to perform the TMVP operation. In other words, when at least one of the width or height of the sub-block and/or the related block of the sub-block is smaller than 8 pixels, it is set not to perform the TMVP operation. Therefore, the performance impact of skipping TMVP operations can be ignored, the encoding and decoding time is effectively saved, and the coding efficiency is improved.

Figure 4:
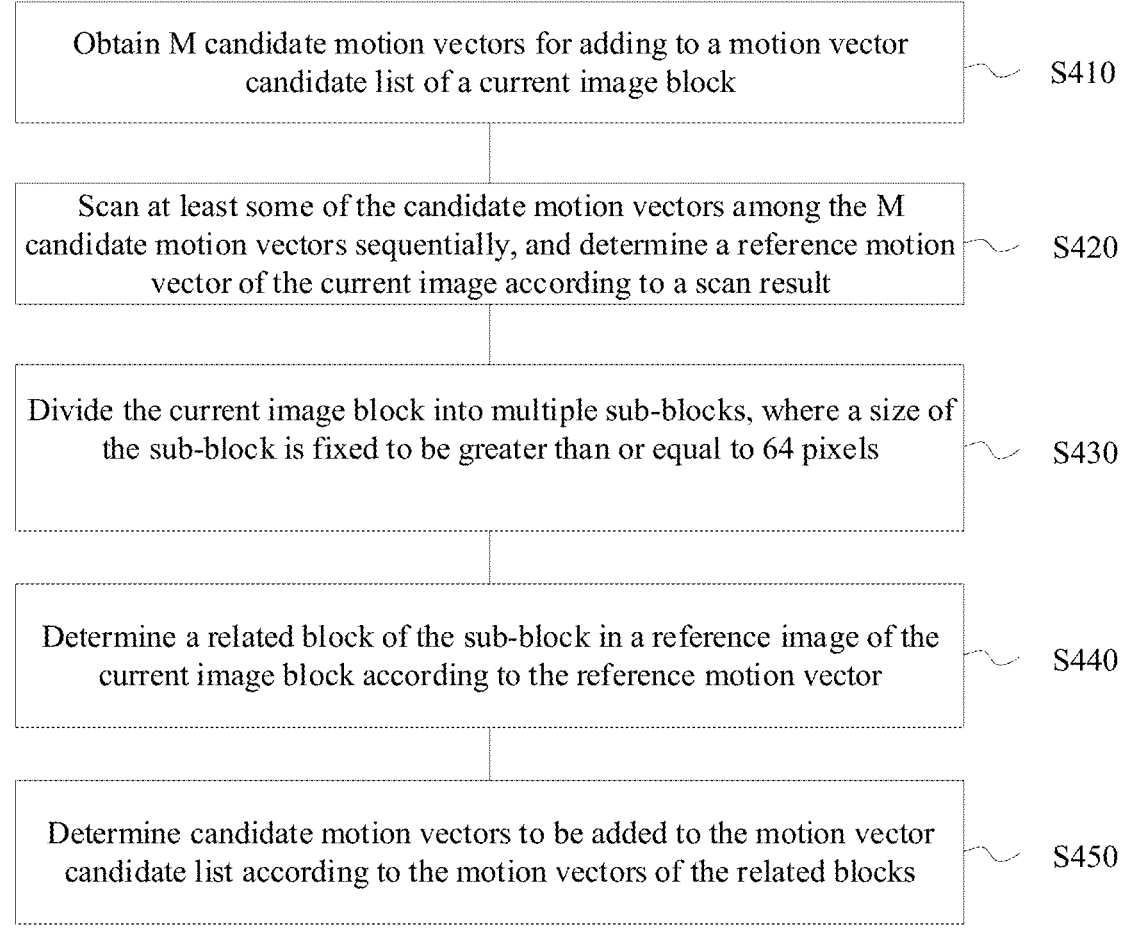
FIG. 4 is another schematic flowchart of a video image processing method according to an embodiment of the disclosure.

FIG. 4 shows a video image processing method according to an embodiment of the present disclosure.

At S410, M candidate motion vectors for adding to a second motion vector candidate list of a current image block are obtained.

The process of S410 corresponds to the process of S110 described above. For the specific description, reference can be made to the description above, which is not repeated here.

At S420, at least some of the candidate motion vectors among the M candidate motion vectors are scanned sequentially, and a reference motion vector of the current image block is determined according to the scan result.

In some embodiments, some of the candidate motion vectors among the M candidate motion vectors are sequentially scanned, and the reference motion vector of the current image block is determined according to the scan result. The process of S420 may correspond to the process of S120 described above. Specific description thereof is omitted.

In some other embodiments, all candidate motion vectors among the M candidate motion vectors are sequentially scanned, and the reference motion vector of the current image block is determined according to the scan result.

For a specific manner of determining the reference motion vector of the current image block according to the scan result at S420, reference may be made to the related description in the foregoing embodiments, and details are not repeated here.

At S430, the current image block is divided into multiple sub-blocks, and a size of the sub-block is fixed to be greater than or equal to 64 pixels.

For example, the current image block is referred to as a CU, and the sub-block obtained after dividing the CU may be referred to as a sub-CU.

At S440, a related block of the sub-block in a reference image of the current image block is determined according to the reference motion vector.

The reference image of the current image block may be a collocated frame of the current image block.

At S450, candidate motion vectors to be added to a second motion vector candidate list are determined according to the motion vectors of the related blocks.

In the ATMVP technology, the size of the sub-block can be adaptively set at the frame level. The size of the sub-block is 4×4 by default. When a certain condition is met, the size of the sub-block is set to 8×8. For example, at the encoding end, when the current image block is encoded, the average block size of each sub-block in the CU is calculated when the last encoded image block in the same time-domain layer is encoded in ATMVP mode. When the average block size is greater than a threshold, the size of the sub-block of the current image block is set to 8×8, otherwise the default value of 4×4 is used. In another word, in the ATMVP technology, when the current image block is encoded, information about the size of the sub-block of the previous encoded image block in the same time-domain layer needs to be stored.

In some embodiments, the size of the sub-block of the current image block is fixed to be greater than or equal to 64 pixels. There is no need to store information about the size of the sub-block of the last encoded image block, therefore, the storage space can be saved.

In some embodiments, the size of the sub-block and/or the size of the related block of the sub-block are both fixed at 8×8 pixels.

In the ATMVP technology, the size of the sub-block can be adaptively set at the frame level. The size of the sub-block is 4×4 by default. When a certain condition is met, the size of the sub-block is set to 8×8. For example, at the encoding end, when the current image block is encoded, the average block size of each sub-block in the CU is calculated when the last encoded image block in the same time-domain layer is encoded in ATMVP mode. When the average block size is greater than a threshold, the size of the sub-block of the current image block is set to 8×8, otherwise the default value of 4×4 is used. At present, in a new generation of the versatile video coding standard (VVC), the motion vector is stored with a size of 8×8. When the size of the sub-block is set to 4×4, the size of the motion vector of the sub-block (also 4×4) does not meet the storage granularity of the motion vector in the current standard. In addition, in the ATMVP technology, when the current image block is encoded, information about the size of the sub-block of the previous encoded image block in the same time-domain layer needs to be stored.

In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

In some embodiments of the present disclosure, when the size of the sub-block and/or the size of the related block of the sub-block is 8×8 pixels, it is set not to perform the TMVP operation. Some of the redundant operation can be skipped, the encoding and decoding time can be effectively saved, and the coding efficiency can be improved.

In some embodiments of the present disclosure, when the width and/or height of the current CU is smaller than 8 pixels, it is set not to perform the TMVP operation. In other words, when at least one of the width or height of the sub-block and/or the related block of the sub-block is smaller than 8 pixels, it is set not to perform the TMVP operation. Therefore, the performance impact of skipping TMVP operations can be ignored, the encoding and decoding time is effectively saved, and the coding efficiency is improved.

On the premise that the size of the sub-block and/or related block of the sub-block is fixed to be equal to 64 pixels, the size of the sub-block and/or the related block of the sub-block may also be other dimensions, for example, the size of the sub-block and/or the size of the related block of the sub-block is A×B, where A≤64, B≤64, and A and B are both multiples of 4. For example, the size of the sub-block and/or the size of the related block of the sub-block is 4×16 pixels, or 16×4 pixels.

In some embodiments, at S420, the at least some of the candidate motion vectors are sequentially scanned. When a first candidate motion vector that meets the preset condition is scanned, the scanning is stopped, and the reference motion vector is determined according to the first scanned candidate motion vector that meets the preset condition.

Determining the reference motion vector according to the first scanned candidate motion vector that meets the preset condition may include using the first candidate motion vector that meets the preset condition as a target neighboring block.

In some embodiments, the preset condition includes that the reference image of the candidate motion vector is the same as the reference image of the current image block.

In some embodiments, at S450, when the motion vector of the related block points to a specific reference image, or when the reference image of the current image block is a specific reference image, the candidate motion vectors to be added to the second motion vector candidate list are determined according to the processed motion vector of the related block. The processed motion vector of the related block is the same as the motion vector of the related block before processing.

For example, the processed motion vector of the related block includes a motion vector obtained by scaling the motion vector of the related block according to a scaling factor of 1, or a motion vector of the related block skipping the scaling process.

In some embodiments, at S450, when the motion vector of the related block points to a specific reference image, or when the reference image of the current image block is a specific reference image, the candidate motion vector to be added to the second motion vector candidate list is determined without referencing to the motion vector of the related block.

In the embodiment as shown in FIG. 4, diving the current image block into multiple sub-blocks with a size of 8×8 can adapt to the storage granularity of the motion vector specified in the video standard VVC on the one hand, and on the other hand, there is no need to store the information of the size of the sub-block of the last encoded image block, therefore, the storage space is saved.

In some embodiments of the present disclosure, when the size of the sub-block and/or the size of the related block of the sub-block is 8×8 pixels, it is set not to perform the TMVP operation. Some of the redundant operation can be skipped, the encoding and decoding time can be effectively saved, and the coding efficiency can be improved.

In some embodiments of the present disclosure, when the width and/or height of the current CU is smaller than 8 pixels, it is set not to perform the TMVP operation. In other words, when at least one of the width or height of the sub-block and/or the related block of the sub-block is smaller than 8 pixels, it is set not to perform the TMVP operation. Therefore, the performance impact of skipping TMVP operations can be ignored, the encoding and decoding time is effectively saved, and the coding efficiency is improved.

The above describes how to determine the candidates to add to the second motion vector candidate list according to the ATMVP technology. In some embodiments, other candidates may be added to the second motion vector candidate list, which is not limited here.

The methods provided according to the embodiments of the present disclosure are described above with reference to FIGS. 1 and 4, and devices corresponding to the above methods are described below. The description of the devices and the description of the methods correspond to each other. Therefore, for content that is not described in detail, reference can be made to the foregoing description, which is not repeated here.

Figure 5:
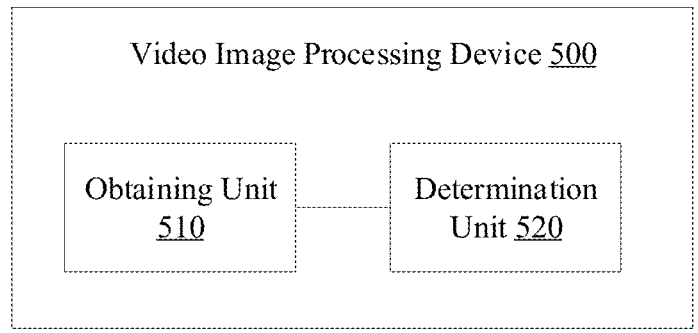
FIG. 5 is a schematic block diagram of a video image processing device according to an embodiment of the disclosure.

FIG. 5 is a schematic block diagram of a device 500 for processing video images according to an embodiment of the present disclosure. The device 500 can be used to execute, e.g., the method embodiment shown in FIG. 1. The device 500 includes an obtaining unit 510 configured to obtain M candidate motion vectors for adding to a second motion vector candidate list of a current image block, and a determination unit 520 configured to sequentially scan the N candidate motion vectors among the M candidate motion vectors and determine a reference motion vector according to a scan result, where N is smaller than M.

The determination unit 520 is further configured to continue to determine candidate motion vectors to be added to the second motion vector candidate list according to the reference motion vector, the current image block, and a reference image of the current image block.

The determination unit 520 is also configured to determine a motion vector of the current image block according to the second motion vector candidate list.

In the first step of the ATMVP technology, a time-domain vector of the current image block is obtained by scanning all candidate motion vectors that are currently added in the second motion vector candidate list. For example, the second motion vector candidate list is usually filled with 4 candidate motion vectors, and all the 4 candidate motion vectors may need to be scanned to obtain the time-domain vector of the current image block.

In the embodiments of the present disclosure, in the process of obtaining the reference motion vector of the current image block, only N (N is smaller than M) candidate motion vectors among the M candidate motion vectors that have been obtained are sequentially scanned. Comparing with the existing technology, the number of scans of the candidate motion vectors in the process of obtaining the reference motion vector of the current image block can be reduced. Applying the solution provided by the present disclosure to the first step of the ATMVP technology can simplify the redundant operations.

An official test sequence of the latest reference software VTM-2.0 of versatile video coding is selected as the test sequence. The test configuration is RA configuration and LDB configuration. The solution provided by this disclosure is tested and the test result shows that the performance gain of ATMVP technology can still be maintained after the number of scans is reduced.

Therefore, the solution provided in this disclosure can reduce the complexity of the ATMVP technology while maintaining the performance gain of the ATMVP technology.

In some embodiments, the obtaining unit 510 is configured to obtain M candidate motion vectors for adding to the second motion vector candidate list of the current image block according to the motion vectors of M neighboring blocks of the current image block in the current frame.

In some embodiments, the neighboring block is an image block that is adjacent to or has a certain distance to the current image block and is on the current frame.

In some embodiments, the determination unit 520 is configured to sequentially scan the first N candidate motion vectors among the M candidate motion vectors.

In some embodiments, M is equal to 4, and N is smaller than 4.

In some embodiments, N is equal to 1 or 2.

In some embodiments, the determination unit 520 is configured to sequentially scan N candidate motion vectors among the M candidate motion vectors based on a preset condition and determine the reference motion vector according to the scan result.

In some embodiments, the preset condition includes that the reference frame pointed to by the candidate motion vector is the same as the reference image of the current image block.

In some embodiments, the determination unit 520 is configured to sequentially scan the N candidate motion vectors. When the first candidate motion vector that meets the preset condition is determined, the scanning is stopped, and according to the first scanned candidate motion vector that meets the preset condition, the reference motion vector is determined.

In some embodiments, the determination unit 520 is configured to scale a specific candidate motion vector in the second motion vector candidate list when no candidate motion vector that meets the preset condition is found among the N candidate motion vectors, and determine the reference motion vector according to the scaled specific candidate motion vector.

In some embodiments, the specific candidate motion vector is the first motion vector or the last motion vector obtained in the scanning order among the N candidate motion vectors.

In some embodiments, the determination unit 520 is configured to scale the specific candidate motion vector in the second motion vector candidate list to make the reference frame pointed to by the scaled specific candidate motion vector the same as the reference image of the current image block, and use the scaled specific candidate motion vector as the reference motion vector.

In some embodiments, the determination unit 520 is configured to use a default value as the reference motion vector when no candidate motion vector that meets the preset condition is found among the N candidate motion vectors.

In some embodiments, the default value is a motion vector of (0, 0).

In some embodiments, the determination unit 520 is configured to divide the current image block into a plurality of sub-blocks, determine a related block of the sub-block in the reference image of the current image block according to the reference motion vector, and determine a candidate motion vector to be added to the second motion vector candidate list according to the motion vector of the related block.

In some embodiments, the size of the sub-block and/or the size of the related block of the sub-block is fixed to be greater than or equal to 64 pixels.

In some embodiments, the current image block is a coding unit CU.

In some embodiments, the determination unit 520 is configured to determine a related block of the current image block in the reference image of the current image block according to the reference motion vector, and determine the candidate motion vector to be added to the second motion vector candidate list according to the motion vector of the related block.

In some embodiments, the determination unit 520 is configured to, when the motion vector of the related block points to the specific reference image, or when the reference image of the current image block is the specific reference image, determine the candidate motion vectors to be added to the second motion vector candidate list according to the processed motion vector of the related block. The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, the determination unit 520 is configured to, when the motion vector of the related block points to the specific reference image, or when the reference image of the current image block is the specific reference image, determine the candidate motion vector to be added to the second motion vector candidate list without referencing to the motion vector of the related block.

In some embodiments, the determination unit 520 is configured to, when the specific candidate motion vector points to the specific reference image, or when the reference image of the current image block is the specific reference image, determine the candidate motion vectors to be added to the second motion vector candidate list according to the processed specific candidate motion vector. The processed specific candidate motion vector is the same as the specific candidate motion vector before processing.

In some embodiments, the processed motion vector of the related block includes a motion vector obtained by scaling the motion vector of the related block according to a scaling factor of 1, or a motion vector of the related block skipping the scaling process.

In some embodiments, the determination unit 520 is configured to, when the specific candidate motion vector points to the specific reference image, or when the reference image of the current image block is the specific reference image, determine the candidate motion vector to be added to the second motion vector candidate list without referencing to the specific candidate motion vector.

In some embodiments, the second motion vector candidate list is a Merge candidate list.

In some embodiments, the reference image of the current image block is a collocated frame of the current image block.

In some embodiments, the size of the sub-block and/or the size of the related block of the sub-block are fixed at 8×8 pixels.

In some embodiments of the present disclosure, when the size of the sub-block and/or the size of the related block of the sub-block is 8×8 pixels, it is set not to perform the TMVP operation. Some of the redundant operation can be skipped, the encoding and decoding time can be effectively saved, and the coding efficiency can be improved.

In some embodiments of the present disclosure, when the width and/or height of the current CU is smaller than 8 pixels, it is set not to perform the TMVP operation. In other words, when at least one of the width or height of the sub-block and/or the related block of the sub-block is smaller than 8 pixels, it is set not to perform the TMVP operation. Therefore, the performance impact of skipping TMVP operations can be ignored, the encoding and decoding time is effectively saved, and the coding efficiency is improved.

Both the obtaining unit 510 and the determination unit 520 in the embodiments may be implemented by a processor.

Figure 6:
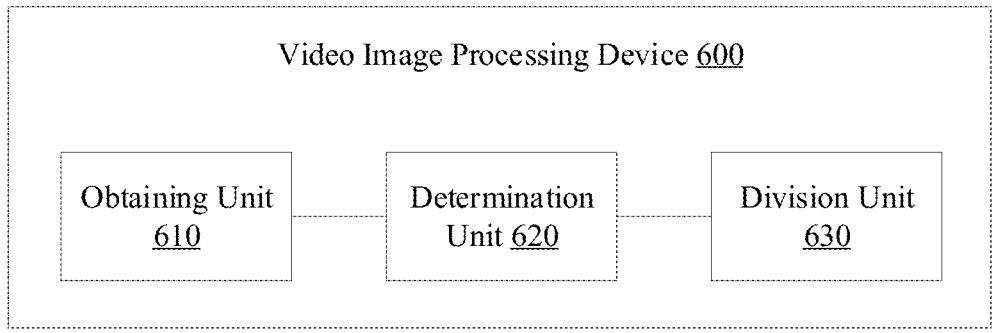
FIG. 6 is another schematic block diagram of a video image processing device according to an embodiment of the disclosure.

FIG. 6 shows a device 600 for processing video images according to another embodiment of the disclosure. The device 600 can be used to execute, e.g., the method embodiment shown in FIG. 4. The device 600 includes an obtaining unit 610 configured to obtain M candidate motion vectors for adding to a second motion vector candidate list of a current image block, a determination unit 620 configured to sequentially scan at least some of the candidate motion vectors among the M candidate motion vectors and determine a reference motion vector according to the scan result, and a division unit 630 configured to divide the current image block into multiple sub-blocks, where a size of the sub-block is fixed to be greater than or equal to 64 pixels.

The determination unit 620 is further configured to determine a related block of the sub-block in a reference image of the current image block according to the reference motion vector.

The determination unit 620 is further configured to determine candidate motion vectors to be added to the second motion vector candidate list according to the motion vector of the related block.

In the ATMVP technology, the size of the sub-block can be adaptively set at the frame level. The size of the sub-block is 4×4 by default. When a certain condition is met, the size of the sub-block is set to 8×8. For example, at the encoding end, when the current image block is encoded, the average block size of each sub-block in the CU is calculated when the last encoded image block in the same time-domain layer is encoded in ATMVP mode. When the average block size is greater than a threshold, the size of the sub-block of the current image block is set to 8×8, otherwise the default value of 4×4 is used. In another word, in the ATMVP technology, when the current image block is encoded, information about the size of the sub-block of the previous encoded image block in the same time-domain layer needs to be stored.

In some embodiments, the size of the sub-block of the current image block is fixed to be greater than or equal to 64 pixels. There is no need to store information about the size of the sub-block of the last encoded image block, therefore, the storage space can be saved.

In some embodiments, the size of the sub-block and/or the size of the related block of the sub-block are both fixed at 8×8 pixels.

At present, in a new generation of the versatile video coding standard (VVC), the motion vector is stored with a size of 8×8. In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

In some embodiments of the present disclosure, when the size of the sub-block and/or the size of the related block of the sub-block is 8×8 pixels, it is set not to perform the TMVP operation. Some of the redundant operation can be skipped, the encoding and decoding time can be effectively saved, and the coding efficiency can be improved.

In some embodiments of the present disclosure, when the width and/or height of the current CU is smaller than 8 pixels, it is set not to perform the TMVP operation. In other words, when at least one of the width or height of the sub-block and/or the related block of the sub-block is smaller than 8 pixels, it is set not to perform the TMVP operation. Therefore, the performance impact of skipping TMVP operations can be ignored, the encoding and decoding time is effectively saved, and the coding efficiency is improved.

In some embodiments, the determination unit 620 is configured to sequentially scan the at least some of the candidate motion vectors. When the first candidate motion vector that meets a preset condition is scanned, the scanning is stopped, and according to the first scanned candidate motion vector that meets the preset condition, the reference motion vector is determined.

In some embodiments, the determination unit 620 is configured to use the first candidate motion vector that meets the preset condition as a target neighboring block.

In some embodiments, the preset condition includes that a reference image of the candidate motion vector is the same as the reference image of the current image block.

The obtaining unit 610, the determination unit 620, and the division unit 630 in the embodiments may be implemented by one or more processors.

As described above, a motion vector of an image block may include information of an image pointed to by the motion vector and a displacement. In some application scenarios, the motion vector of an image block only includes the information of "displacement." The image block additionally provides index information for indicating the reference image of the image block. For the encoded/decoded image block, the motion vector means the displacement of the reference block of the encoded/decoded image block on the reference image relative to the image block that has the same location as the encoded/decoded image block and is located in the reference image. When determining the reference block of the encoded/decoded image block, the index information of the reference image of the encoded/decoded image block and the motion vector of the encoded/decoded image block are needed to determine the reference block of the encoded/decoded image block. Then, in the video image processing method shown in FIG. 1, at S120, the candidate motion vectors in the second motion vector candidate list are not scanned, instead, the image blocks corresponding to the candidate motion vectors are scanned directly. In the following, for the new definition of the motion vector (that is, it contains the "displacement" information but not the "image pointed to"), a video image processing method is provided. The methods for determining candidate motion vectors based on ATMVP technology provided for these two different definitions of "motion vector" are basically the same. The above explanations also apply to the video image processing methods provided below. The main difference is in the construction of the second motion vector candidate list. When the candidate added to the second motion vector candidate list is determined according to the ATMVP technology, in the video image processing method described above, the motion vectors that have been added to the second motion vector candidate list are scanned, however, in the video image processing method provided below, the image blocks corresponding to the motion vectors that have been added to the second motion vector candidate list are scanned.

Figure 7:
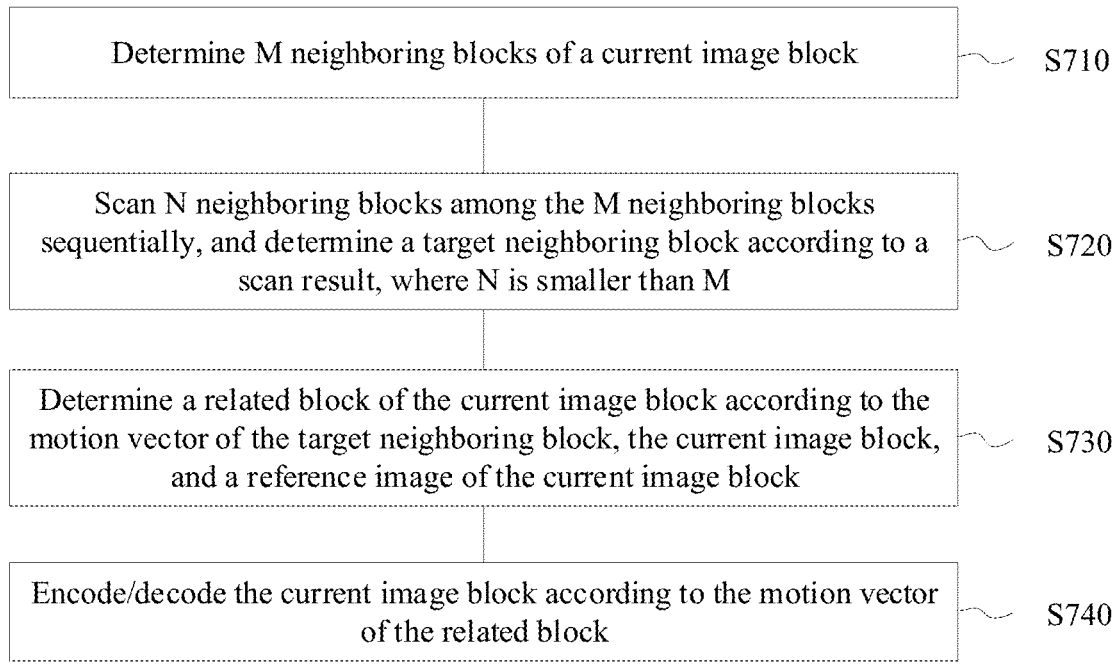
FIG. 7 is a schematic flowchart of a video image processing method according to an embodiment of the disclosure.

FIG. 7 shows a method for processing video images according to an embodiment of the present disclosure.

At S710, M neighboring blocks of a current image block are determined.

The current image block is an image block to be encoded (or decoded). For example, the current image block is a coding unit (CU).

An image frame where the current image block is located is referred to as a current frame.

The neighboring block is an image block adjacent to or having a certain distance to the current image block in a current image.

M neighboring blocks are image blocks in the current frame that have been encoded (or decoded).

For example, as shown in FIG. 2, the 4 neighboring blocks of the current image block are determined in an order of the image blocks shown in FIG. 2 located at four locations $A_1$ (left)→$B_1$ (top)→$B_0$ (upper right)→$A_0$ (lower left) around the current image block.

At S720, the N neighboring blocks among the M neighboring blocks are scanned sequentially, and a target neighboring block is determined according to a scan result, where N is smaller than M.

Determining the target neighboring block according to the scan result of the N neighboring blocks may be determining the N neighboring blocks sequentially based on a preset condition and determining the target neighboring block according to the determination result.

For example, the preset condition is that a reference image of the neighboring block is the same as a reference image of the current image block.

The reference image of the current image block is a reference image with a shortest temporal distance to the image where the current image block is located, or the reference image of the current image block is a reference image preset at the encoding and decoding ends, or the reference image of the current image block is a reference image specified in a video parameter set, a sequence header, a sequence parameter set, an image header, an image parameter set, or a slice header.

For example, the reference image of the current image block is a collocated frame of the current image block, and the collocated frame is a frame set in a slice-level information header for obtaining motion information for prediction.

According to the evolution of future technology, the preset condition may be given other different definitions, and the corresponding solution also falls within the scope of the present disclosure.

The process of determining the target neighboring blocks according to the scan result of N neighboring blocks is described in detail below.

At S720, only N neighboring blocks out of the M neighboring blocks obtained in the process of S710 are scanned, which can reduce the number of scans.

In some embodiments, at S720, the first N neighboring blocks among the M neighboring blocks may be sequentially scanned.

When the M neighboring blocks of the current image block are sequentially determined in a preset order in the process of S710, the first N neighboring blocks obtained in the process of S720 refer to the N neighboring blocks determined first in the preset order.

In some embodiments, at S720, the last N neighboring blocks among the M neighboring blocks may be sequentially scanned, or, the middle N neighboring blocks among the M neighboring blocks may be sequentially scanned, which is not limited in the disclosure.

At S730, a related block of the current image block is determined according to the motion vector of the target neighboring block, the current image block, and the reference image of the current image block.

At S740, the current image block is encoded/decoded according to the motion vector of the related block.

In some embodiments, at S740, the reference block of the current image block is determined according to the motion vector of the related block and the reference image.

For example, at S740, a candidate block list of the current image block is constructed and the candidate blocks in the candidate block list include the M neighboring blocks and the related blocks. The current image block is encoded/decoded according to the reference block of the candidate block in the candidate block list.

In one example, the candidate block list is a Merge candidate list of the current image block. In another example, the candidate block list is an AMVP candidate list of the current image block.

At the encoding end, an index of the candidate block of the current block is written into the bitstream. At the decoding end, after the index is obtained, a candidate block corresponding to the index is found from the candidate block list, and the reference block of the current image block is determined according to the reference block of the candidate block, or the motion vector of the current image block is determined according to the motion vector of the candidate block.

For example, the reference block of the candidate block is directly determined as the reference block of the current image block, or the motion vector of the candidate block is directly determined as the motion vector of the current image block. For another example, at the encoding end, the MVD of the current block is also written into the bitstream. After the MVD is obtained at the decoding end, MVD is added to the motion vector of the candidate block and the result is used as the motion vector of the current block, and then the reference block of the current block is determined according to the motion vector and the reference image of the current block.

In the embodiments of the present disclosure, in the process of obtaining the target neighboring block of the current image block, only N (N is smaller than M) neighboring blocks among the M neighboring blocks that have been obtained are sequentially scanned. Comparing with the existing technology, the number of scans of the candidate neighboring blocks in the process of obtaining the target neighboring blocks of the current image block can be reduced, thereby reducing complexity.

In some embodiments, at S710, the four neighboring blocks of the current image block in the current frame are determined, that is, M is equal to 4. At S720, N neighboring blocks among the 4 neighboring blocks are scanned, and N is smaller than 4.

For example, N is equal to 1. At S720, only the first neighboring block among the four neighboring blocks is scanned.

For another example, N is equal to 2 or 3.

The method of determining the target neighboring block according to the scan results of the N neighboring blocks at S720 is described below.

In some embodiments, at S720, the N neighboring blocks are sequentially scanned. When a first neighboring block that meets the preset condition is found, the scanning is stopped, and the target neighboring block is determined according to the first scanned neighboring block that meets the preset condition.

For example, the preset condition is that the reference image of the neighboring block is the same as the reference image of the current image block.

According to the evolution of future technology, the preset conditions may also be given other definitions.

Hereinafter, the preset condition is that the reference image of the neighboring block is the same as the reference image of the current image block. Examples with this definition are described as follows.

For example, the first neighboring block that meets the preset condition is used as the target neighboring block.

In some embodiments, at S720, when no neighboring block that meets the preset condition is found among the N neighboring blocks, the method further includes scaling the motion vector of a specific neighboring block among the M neighboring blocks, and encoding/decoding the current image block according to a scaled motion vector.

For example, the reference block of the current image block is determined according to the scaled motion vector and the reference image of the current image block.

In some embodiments, the specific neighboring block is the first neighboring block, or the last neighboring block obtained according to a scanning order among the N neighboring blocks.

The specific neighboring block may also be a neighboring block obtained in another scanning order among the N neighboring blocks.

In some embodiments, encoding/decoding the current image block according to the scaled motion vector includes scaling the motion vector of the specific neighboring block to make the reference frame pointed to by the scaled motion vector the same as the reference image of the current image block, and using the image block pointed to by the scaled motion vector in the reference image of the current image block as the reference block of the current image block.

In some embodiments, at S720, when no neighboring block meeting the preset condition is found among the N neighboring blocks, a default block is used as the candidate reference block of the current image block.

For example, the default block is an image block pointed to by a motion vector (0, 0).

The process of determining the related block of the current image block according to the motion vector of the target neighboring block, the current image block, and the reference image of the current image block at S730 is described below.

In some embodiments, determining the related block of the current image block according to the motion vector of the target neighboring block, the current image block, and the reference image of the current image block includes dividing the current image block into multiple sub-blocks, determining the related block of the sub-block in the reference image of the current image block according to the motion vector of the target neighboring block. The related block of the current image block includes the related block of the sub-block.

The related block may be referred to as a collocated block or a corresponding block.

For example, the current image block is a CU, and the sub-block obtained after dividing the CU may be referred to as a sub-CU.

In some embodiments, the size of the sub-block and/or the size of the related block of the sub-block is fixed to be greater than or equal to 64 pixels.

In some embodiments, the size of the sub-block and/or the size of the related block of the sub-block are both fixed at 8×8 pixels.

In the ATMVP technology, the size of the sub-block can be adaptively set at the frame level. The size of the sub-block is 4×4 by default. When a certain condition is met, the size of the sub-block is set to 8×8. For example, at the encoding end, when the current image block is encoded, the average block size of each sub-block in the CU is calculated when the last encoded image block in the same time-domain layer is encoded in ATMVP mode. When the average block size is greater than a threshold, the size of the sub-block of the current image block is set to 8×8, otherwise the default value of 4×4 is used. At present, in a new generation of the versatile video coding standard (VVC), the motion vector is stored with a size of 8×8. When the size of the sub-block is set to 4×4, the size of the motion vector of the sub-block (also 4×4) does not meet the storage granularity of the motion vector in the current standard. In addition, in the ATMVP technology, when encoding the current image block, information about the size of the sub-block of the previous encoded image block in the same time-domain layer needs to be stored.

In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

In some embodiments of the present disclosure, when the size of the sub-block and/or the size of the related block of the sub-block is 8×8 pixels, it is set not to perform the TMVP operation. Some of the redundant operation can be skipped, the encoding and decoding time can be effectively saved, and the coding efficiency can be improved.

In some embodiments of the present disclosure, when the width and/or height of the current CU is smaller than 8 pixels, it is set not to perform the TMVP operation. In other words, when at least one of the width or height of the sub-block and/or the related block of the sub-block is smaller than 8 pixels, it is set not to perform the TMVP operation. Therefore, the performance impact of skipping TMVP operations can be ignored, the encoding and decoding time is effectively saved, and the coding efficiency is improved.

On the premise that the size of the sub-block and/or related block of the sub-block is fixed to be equal to 64 pixels, the size of the sub-block and/or the related block of the sub-block may also be other dimensions, for example, the size of the sub-block and/or the size of the related block of the sub-block is A×B, where A≤64, B≤64, and A and B are both multiples of 4. For example, the size of the sub-block and/or the size of the related block of the sub-block is 4×16 pixels, or 16×4 pixels.

In some embodiments, determining the related block of the current image block according to the motion vector of the target neighboring block, the current image block, and the reference image of the current image block includes determining the related block of the current image block in the reference image of the current image block according to the motion vector of the target neighboring block.

In some embodiments, at S740, when the reference image of the related block is a specific reference image or when the reference image of the current image block is a specific reference image, the candidate reference block of the current image block is determined according to the processed motion vector of the related block and the reference image of the current image block. The processed motion vector of the related block is the same as the motion vector of the related block before processing.

For example, the processed motion vector of the related block includes a motion vector obtained by scaling the motion vector of the related block according to a scaling factor of 1, or a motion vector of the related block skipping the scaling process.

In some embodiments, at S740, when the reference image of the related block is a specific reference image, or when the reference image of the current block is a specific reference image, the candidate reference block of the current image block is determined without referencing to the motion vector of the related block.

In some embodiments, at S720, when the motion vector of the specific neighboring block points to a specific reference image or when the reference image of the current image block is a specific reference image, the reference block of the current image block is determined according to the processed motion vector of the related block and the reference image of the current image block. The processed motion vector of the related block is the same as the motion vector of the related block before processing.

The processed motion vector of the related block includes a motion vector obtained by scaling the motion vector of the related block according to a scaling factor of 1, or a motion vector of the related block skipping the scaling process.

In the embodiments of the present disclosure, in the process of obtaining the target neighboring block of the current image block, only N (N is smaller than M) neighboring blocks among the M neighboring blocks that have been obtained are sequentially scanned. Comparing with the existing technology, the number of scans of the candidate neighboring blocks in the process of obtaining the target neighboring blocks of the current image block can be reduced, thereby reducing complexity.

When no neighboring block whose reference frame is the same as the collocated frame of the current frame is found among the N neighboring blocks, the motion vector of one neighboring block among the N neighboring blocks is scaled to make the reference frame the same as the collocated frame of the current frame, and then the scaled motion vector is used as the motion vector of the current image block. In this way, the accuracy of the motion vector of the current image block can be improved.

Diving the current image block into multiple sub-blocks with a size of 8×8 can adapt to the storage granularity of the motion vector specified in the video standard VVC on the one hand, and on the other hand, there is no need to store the information of the size of the sub-block of the last encoded image block, therefore, the storage space is saved.

In some embodiments of the present disclosure, when the size of the sub-block and/or the size of the related block of the sub-block is 8×8 pixels, it is set not to perform the TMVP operation. Some of the redundant operation can be skipped, the encoding and decoding time can be effectively saved, and the coding efficiency can be improved.

In some embodiments of the present disclosure, when the width and/or height of the current CU is smaller than 8 pixels, it is set not to perform the TMVP operation. In other words, when at least one of the width or height of the sub-block and/or the related block of the sub-block is smaller than 8 pixels, it is set not to perform the TMVP operation. Therefore, the performance impact of skipping TMVP operations can be ignored, the encoding and decoding time is effectively saved, and the coding efficiency is improved.

In some embodiments, the process of determining the motion vector of the current image block involves using a motion vector of a certain image block on another image to determine the motion vector of the image block. For convenience of description, the image block is referred to as a first image block, and the certain image block on another image to be used is referred to as a time-domain reference block or a related block of the first image block. The first image block and the time-domain reference block (or the related block) of the first image block are located on different images. Then, in the process of determining the motion vector of the first image block using the motion vector of the time-domain reference block (or the related block), the motion vector of the time-domain reference block (or the related block) needs to be scaled. For convenience of description, the term "related block" is used in the disclosure.

For example, when the ATMVP technology is applied in constructing an AMVP candidate list, after the related block of the current image block is determined according to the ATMVP technology, and when the motion vector of the current image block is being determined according to the motion vector of the related block, the motion vector of the related block needs to be scaled, and then motion vector of the current image is determined according to the scaled motion vector. Generally speaking, a scaling factor of the motion vector of the related block is determined based on a temporal distance between the reference image pointed to by the motion vector of related block and the image where the related block is located, and a temporal distance between the reference image of the current image block and the image where the current image block is located.

In one example, the motion vector of the related block is referred to as MV 2, and the index value of the reference frame of the reference image pointed to by the motion vector MV 2 is x. The index value x of the reference frame is the difference between the sequence number of the reference image pointed to by MV 2 (for example, POC) and the sequence number of the image where the related block is located. The index value of the reference frame of the reference image of the first image block is y. The index value y of the reference frame is the difference between the sequence number of the reference image of the first image block and the sequence number of the image where the first image block is located. Then, the scaling factor of the motion vector MV 2 is y/x. In some embodiments, the product of the motion vector MV 2 and y/x may be used as the motion vector of the first image block.

However, when the motion vector MV 2 of the related block points to a specific reference image, or when the reference image of the first image block is a specific reference image, because the definition of the temporal distance between the specific reference image and the image where the first image block is located is not clear, it may be meaningless to scale the motion vector MV 2 of the related block.

In some embodiments, when the motion vector of the current image block is determined according to the motion vector of the related block, and when the motion vector of the related block points to a specific reference image, or when the reference image of the current image block is a specific reference image, the motion vector of the current image block is determined according to the processed motion vector of the related block. The processed motion vector of the related block is the same as the motion vector of the related block before processing.

For example, the processed motion vector of the related block includes a motion vector obtained by scaling the motion vector of the related block according to a scaling factor of 1, or a motion vector of the related block skipping the scaling process.

In some embodiments, when the motion vector of the current image block is determined according to the motion vector of the related block, and when the motion vector of the related block points to a specific reference image, or when the reference image of the current image block is a specific reference image, the motion vector of the current image block is determined without referencing to the motion vector of the related block.

Figure 8:
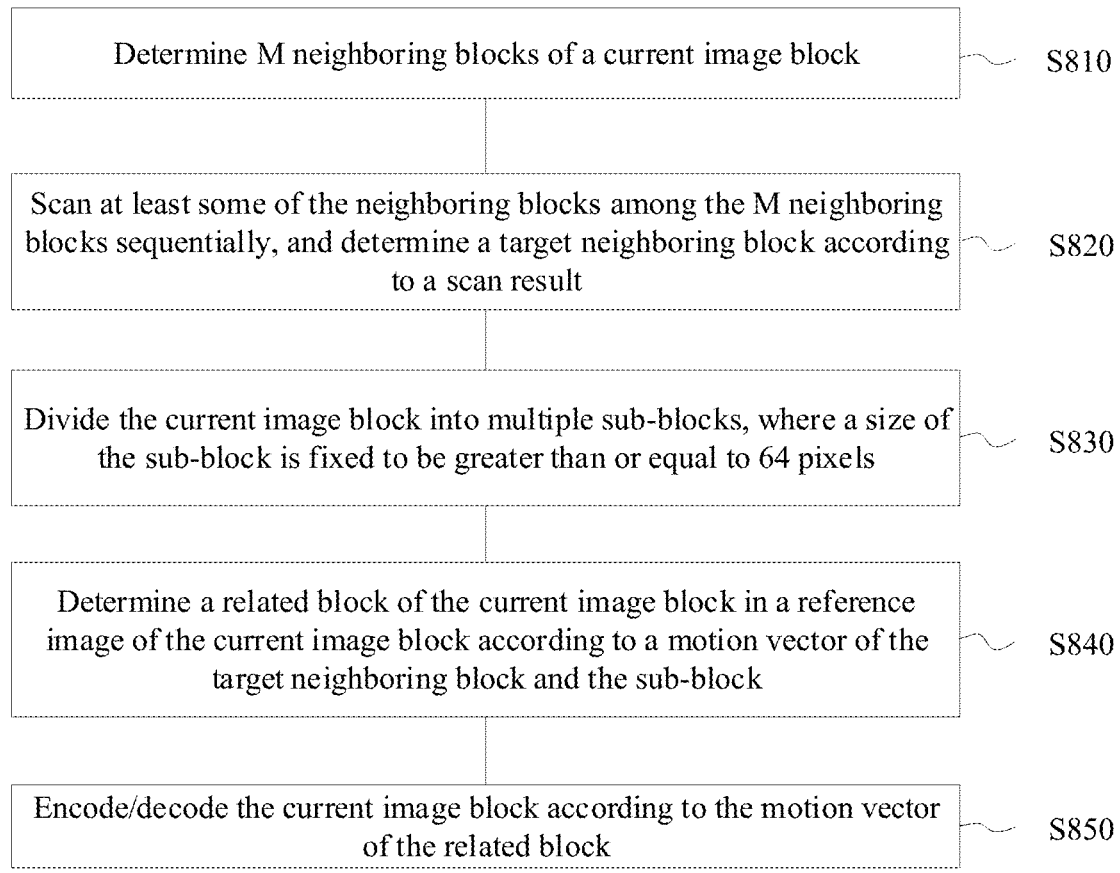
FIG. 8 is another schematic flowchart of a video image processing method according to an embodiment of the disclosure.

FIG. 8 shows a method for processing video images according to another embodiment of the present disclosure.

At S810, M neighboring blocks of a current image block are determined.

The process of S810 may correspond to the process of S710 in the above embodiment.

At S820, at least some of the neighboring blocks among the M neighboring blocks are sequentially scanned, and a target neighboring block is determined according to a scan result.

In some embodiments, some of the neighboring blocks among the M neighboring blocks are sequentially scanned, and the target neighboring block is determined according to a scan result.

In some embodiments, all neighboring blocks among the M neighboring blocks are sequentially scanned, and the target neighboring block is determined according to a scan result.

At S830, the current image block is divided into multiple sub-blocks and a size of the sub-block is fixed to be greater than or equal to 64 pixels.

At S840, a related block of the current image block in a reference image of the current image block is determined according to a motion vector of the target neighboring block and the sub-block.

In some embodiments, the reference image of the current image block is a reference image with a shortest temporal distance to the image where the current image block is located.

In some embodiments, the reference image of the current image block is a reference image preset at the encoding end.

In some embodiments, the reference image of the current image block is a reference image specified in a video parameter set, a sequence header, a sequence parameter set, an image header, an image parameter set, or a slice header.

At S850, the current image block is encoded/decoded according to the motion vector of the related block.

In the embodiments of the disclosure, the size of the sub-block of the current image block is fixed to be greater than or equal to 64 pixels, and there is no need to store the information of the size of the sub-block of the previous encoded image block, therefore, storage space can be saved.

In some embodiments, the size of the sub-block and/or the size of the time-domain reference block of the sub-block are both fixed at 8×8 pixels.

At present, in a new generation of the versatile video coding standard (VVC), the motion vector is stored with a size of 8×8. In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

In some embodiments of the present disclosure, when the size of the sub-block and/or the size of the related block of the sub-block is 8×8 pixels, it is set not to perform the TMVP operation. Some of the redundant operation can be skipped, the encoding and decoding time can be effectively saved, and the coding efficiency can be improved.

In some embodiments of the present disclosure, when the width and/or height of the current CU is smaller than 8 pixels, it is set not to perform the TMVP operation. In other words, when at least one of the width or height of the sub-block and/or the related block of the sub-block is smaller than 8 pixels, it is set not to perform the TMVP operation. Therefore, the performance impact of skipping TMVP operations can be ignored, the encoding and decoding time is effectively saved, and the coding efficiency is improved.

On the premise that the size of the sub-block and/or the related block of the sub-block is fixed to be equal to 64 pixels, the size of the sub-block and/or the related block of the sub-block may also be other dimensions, for example, the size of the sub-block and/or the size of the related block of the sub-block is A×B, where A≤64, B≤64, and A and B are both multiples of 4. For example, the size of the sub-block and/or the size of the related block of the sub-block is 4×16 pixels, or 16×4 pixels.

In some embodiments, at step S820, at least some of the neighboring blocks are sequentially scanned. When a first neighboring block that meets a preset condition is scanned, the scanning is stopped, and according to the first scanned neighboring block that meets the preset condition, a target neighboring block is determined.

For example, the first neighboring block that meets the preset condition is used as the target neighboring block.

For example, the preset condition is that the reference image of the neighboring block is the same as the reference image of the current image block.

In some embodiments, at S840, a related block of the sub-block in the reference image of the current image block is determined according to the motion vector of the target neighboring block and the sub-block. The related block of the current image block includes the related block of the sub-block.

The methods provided according to the embodiments of the present disclosure are described above with reference to FIGS. 7 and 8, and devices corresponding to the above methods are described below. The description of the devices and the description of the methods correspond to each other. Therefore, for content that is not described in detail, reference can be made to the foregoing description, which is not repeated here.

Figure 9:
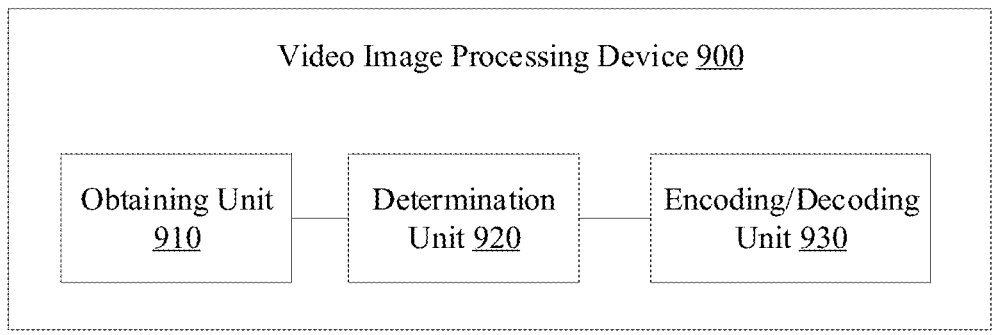
FIG. 9 is another schematic block diagram of a video image processing device according to an embodiment of the disclosure.

FIG. 9 is a schematic block diagram of a device 900 for processing video images according to an embodiment of the present disclosure. The device 900 can be used to execute, e.g., the method embodiment shown in FIG. 7. The device 900 includes an obtaining unit 910 configured to obtain M neighboring blocks of a current image block, a determination unit 920 configured to sequentially scan the N neighboring blocks among the M neighboring blocks and determine a target neighboring block according to a scan result, where N is smaller than M, and an encoding/decoding unit 930 configured to encode/decode the current image block according to the motion vector of a related block of the current image block, which is determined by the determination unit 920 according to a motion vector of the target neighboring block, the current image block, and a reference image of the current image block.

In the embodiments of the present disclosure, in the process of obtaining the target neighboring block of the current image block, only N (N is smaller than M) neighboring blocks among the M neighboring blocks that have been obtained are sequentially scanned. Comparing with the existing technology, the number of scans of the candidate neighboring blocks in the process of obtaining the target neighboring blocks of the current image block can be reduced, thereby reducing complexity.

In some embodiments, M is equal to 4, and N is smaller than 4.

In some embodiments, N is equal to 1 or 2.

In some embodiments, the determination unit 920 is configured to sequentially scan the first N neighboring blocks among the M neighboring blocks.

In some embodiments, the obtaining unit 910 is configured to obtain M neighboring blocks of the current image block sequentially in a preset order. The first N neighboring blocks refer to the N neighboring blocks determined first in the preset order.

In some embodiments, the determination unit 920 is configured to sequentially scan the N neighboring blocks. When a first neighboring block that meets a preset condition is scanned, the scanning is stopped, and a target neighboring block is determined according to the scanned first neighboring block that meets the preset condition.

In some embodiments, the determination unit 920 is configured to use the first neighboring block that meets the preset condition as the target neighboring block.

In some embodiments, the preset condition includes that the reference image of the neighboring block is the same as the reference image of the current image block.

In some embodiments, the encoding/decoding unit 930 is configured to determine a reference block of the current image block according to a motion vector of the related block and a reference image.

In some embodiments, the encoding/decoding unit 930 is configured to construct a candidate block list of the current image block. The candidate blocks in the candidate block list include the M neighboring blocks and the related blocks. According to the reference blocks of the candidate blocks in the candidate block list, the current image block is encoded and decoded.

In some embodiments, the encoding/decoding unit 930 is further configured to, when no neighboring block that meets the preset condition is found among the N neighboring blocks, scale a motion vector of a specific neighboring block among the M neighboring blocks, and encode/decode the current image block according to the scaled motion vector.

In some embodiments, the encoding/decoding unit 930 is configured to determine the reference block of the current image block according to the scaled motion vector and the reference image of the current image block.

In some embodiments, the specific neighboring block is a first neighboring block, or a last neighboring block obtained in a scanning order among the N neighboring blocks.

In some embodiments, the encoding/decoding unit 930 is configured to scale the motion vector of the specific neighboring block to make a reference frame pointed to by the scale motion vector the same as the reference image of the current image block, and use the image block pointed to by the scaled motion vector in the reference image of the current image block as the reference block of the current image block.

In some embodiments, the determination unit 920 is configured to use a default block as the reference block of the current image block when no neighboring block that meets the preset condition is found among the N neighboring blocks.

In some embodiments, the default block is an image block pointed to by a motion vector (0, 0).

In some embodiments, the determination unit 920 is configured to divide the current image block into a plurality of sub-blocks, determine a related block of the sub-block in the reference image of the current image block according to the motion vector of the target neighboring block. The related block of the current image block includes the related block of the sub-block.

In some embodiments, the size of the sub-block and/or the size of the related block of the sub-block is fixed to be greater than or equal to 64 pixels.

In some embodiments of the present disclosure, when the size of the sub-block and/or the size of the related block of the sub-block is 8×8 pixels, it is set not to perform the TMVP operation. Some of the redundant operation can be skipped, the encoding and decoding time can be effectively saved, and the coding efficiency can be improved.

In some embodiments of the present disclosure, when the width and/or height of the current CU is smaller than 8 pixels, it is set not to perform the TMVP operation. In other words, when at least one of the width or height of the sub-block and/or the related block of the sub-block is smaller than 8 pixels, it is set not to perform the TMVP operation. Therefore, the performance impact of skipping TMVP operations can be ignored, the encoding and decoding time is effectively saved, and the coding efficiency is improved.

In some embodiments, the current image block is a coding unit (CU).

In some embodiments, the determination unit 920 is configured to determine a related block of the current image block in the reference image of the current image block according to the motion vector of the target neighboring block.

In some embodiments, the neighboring block is an image block adjacent to or having a certain distance to the current image block on the current image.

In some embodiments, the encoding/decoding unit 930 is configured to, when the reference image of the related block is the specific reference image, or when the reference image of the current image block is the specific reference image, determine the reference block of the current image block according to the processed motion vector of the related block and the reference image of the current image block.

The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, the encoding/decoding unit 930 is configured to, when the reference image of the related block is the specific reference image, or when the reference image of the current block is the specific reference image, determine the reference block of the current image block without referencing to the motion vector of the related block.

In some embodiments, the determination unit 920 is configured to, when the motion vector of the specific neighboring block points to the specific reference image or when the reference image of the current image block is the specific reference image, determine the reference block of the current image block according to the processed motion vector of the related block and the reference image of the current image block. The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

The obtaining unit 910, the determination unit 920, and the encoding/decoding unit 930 in the embodiments may be implemented by one or more processors.

Figure 10:
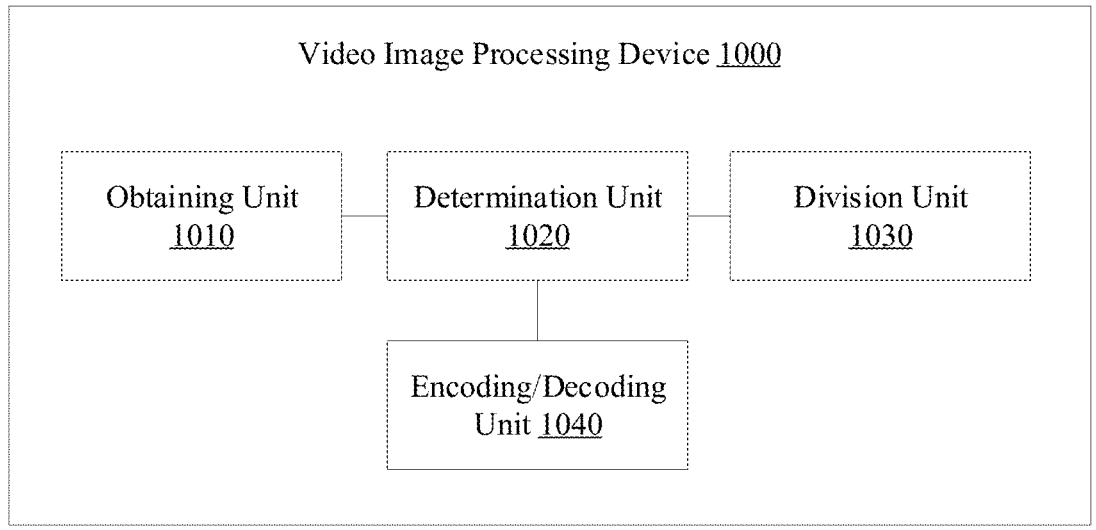
FIG. 10 is another schematic block diagram of a video image processing device according to an embodiment of the disclosure.

FIG. 10 schematically shows a device 1000 for processing video images according to another embodiment of the present disclosure. The device 1000 can be used to execute, e.g., the method embodiment shown in FIG. 8. The device 1000 includes an obtaining unit 1010 configured to obtain M neighboring blocks of a current image block, a determination unit 1020 configured to sequentially scan at least some of the neighboring blocks among the M neighboring blocks and determine a target neighboring block according to a scan result, a division unit 1030 configured to divide the current image block into multiple sub-blocks, where a size of the sub-block is fixed to be greater than or equal to 64 pixels, and an encoding/decoding unit 1040 configured to encode/decode the current image block according to a motion vector of a related block of the current image block, which is determined in a reference image of the current image block by the determination unit 1020 according to the motion vector of the target neighboring block and sub-block.

In some embodiments, the size of the sub-block of the current image block is fixed to be greater than or equal to 64 pixels. There is no need to store information about the size of the sub-block of the last encoded image block, therefore, the storage space can be saved.

In some embodiments, the size of the sub-block and/or the size of the time-domain reference block of the sub-block are both fixed at 8×8 pixels.

At present, in a new generation of the versatile video coding standard (VVC), the motion vector is stored with a size of 8×8. In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

In some embodiments of the present disclosure, when the size of the sub-block and/or the size of the related block of the sub-block is 8×8 pixels, it is set not to perform the TMVP operation. Some of the redundant operation can be skipped, the encoding and decoding time can be effectively saved, and the coding efficiency can be improved.

In some embodiments of the present disclosure, when the width and/or height of the current CU is smaller than 8 pixels, it is set not to perform the TMVP operation. Therefore, the performance impact of skipping TMVP operations can be ignored, the encoding and decoding time is effectively saved, and the coding efficiency is improved.

On the premise that the size of the sub-block and/or the related block of the sub-block is fixed to be equal to 64 pixels, the size of the sub-block and/or the related block of the sub-block may also be other dimensions, for example, the size of the sub-block and/or the size of the related block of the sub-block is A×B, where A≤64, B≤64, and A and B are both multiples of 4. For example, the size of the sub-block and/or the size of the related block of the sub-block is 4×16 pixels, or 16×4 pixels.

In some embodiments, sequentially scanning the at least some of the neighboring blocks among the M neighboring blocks and determining the target neighboring block according to the scan result includes sequentially scanning the at least some of the neighboring blocks, when a first neighboring block that meets a preset condition is scanned, stopping the scanning, and determining the target neighboring block according to the first scanned neighboring block that meets the preset condition.

In some embodiments, the determination unit 1020 is configured to use the first neighboring block that meets the preset condition as a target neighboring block.

In some embodiments, the preset condition includes that a reference image of the neighboring block is the same as the reference image of the current image block.

In some embodiments, the determination unit 1020 is configured to determine a related block of the sub-block in the reference image of the current image block according to the motion vector of the target neighboring block and the sub-block. The related block of the current image block includes the related block of the sub-block.

The obtaining unit 1010, the determination unit 1020, the division unit 1030, and the encoding/decoding unit 1040 in the embodiments may be implemented by one or more processors.

Figure 11:
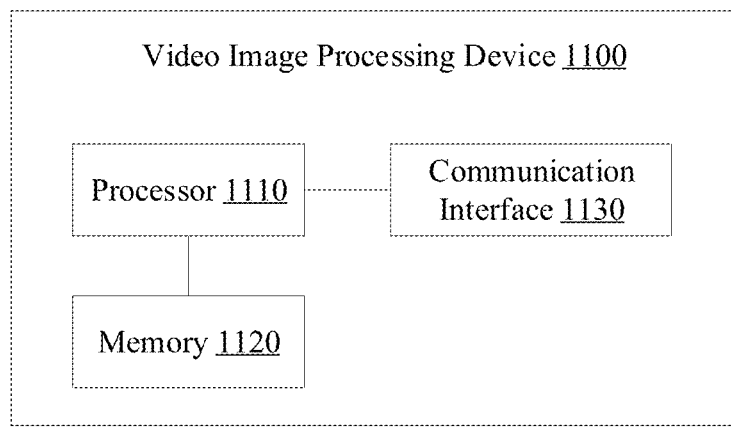
FIG. 11 is another schematic block diagram of a video image processing device according to an embodiment of the disclosure.

FIG. 11 schematically shows a device 1100 for processing video images according to another embodiment of the present disclosure. The device 1100 may be used to execute the method embodiments described above. The device 1100 includes a processor 1110 and a memory 1120. The memory 1120 is used to store instructions. The processor 1110 is configured to execute the instructions stored in the memory 1120 to perform a method consistent with the disclosure, such as one of the above-described example methods.

In some embodiments, as shown in FIG. 11, the device 1100 further includes a communication interface 1130 for communicating with external devices. For example, the processor 1110 is configured to control the communication interface 1130 to receive and/or send signals.

The devices 500, 600, 900, 1000, and 1100 provided in this disclosure may be applied to an encoder or a decoder.

The second motion vector candidate list is explained above, and the first motion vector candidate list will be explained below.

In the motion compensation prediction stage, only a translational motion model is applied in the mainstream video coding standards. In the real applications, there are too many forms of motion, such as zoom in/out, rotation, distant motion and other irregular motions. In order to improve the efficiency of inter prediction, an affine transformation motion compensation model can be introduced into the encoding and decoding technology. The affine transformation motion compensation describes an affine motion field of an image block through MVs of a set of control points. For example, the affine transformation motion compensation model adopts a four-parameter affine model, and the group of control points includes two control points (for example, the upper left corner point and the upper right corner point of the image block). As another example, the affine transformation motion compensation model adopts a six-parameter affine model, and the group of control points includes three control points (for example, the upper left corner point, the upper right corner point, and the lower left corner point of the image block).

In an implementation manner, when the first motion vector candidate list is constructed, the added candidates may be MVs of a group of control points, which may be called control point motion vector prediction (CPMVP). In some embodiments, the first motion vector candidate list may be used in the Merge mode, which may be called an Affine Merge mode. Correspondingly, the first motion vector candidate list may be called an affine merge candidate list. In the Affine Merge mode, the prediction in the first motion vector candidate list is directly used as the control point motion vector (CPMV) of the current image block, that is, no affine motion prediction process is required.

In another implementation manner, a candidate determined according to the ATMVP technology may be added to the first motion vector candidate list.

For example, the control point motion vector group of the related block of the current image block is added as a candidate to the first motion vector candidate list. When the candidate in the first motion vector list is used for prediction, the control point motion vector group of the related block of the current image block is used for prediction on the current image block.

For example, as described above, the representative motion vector of the related block of the current image block is added as a candidate to the first motion vector candidate list. Further, the candidate may be also identified as being determined according to the ATMVP technology. When the candidate in the first motion vector candidate list is used for prediction, the related block of the current image block is determined according to the identifier and the candidate, and the current image block and the related block are divided into multiple sub-blocks in the same way. Sub-blocks in the current image block correspond to sub-blocks in the related block in a one-to-one correspondence. Various sub-blocks in the current image block are respectively predicted according to the motion vectors of various corresponding sub-blocks in the related block.

In some embodiments, when a sub-block with an unavailable motion vector exists in the related block, the representative motion vector of the related block is used to replace the unavailable motion vector to predict the corresponding sub-block in the current image block. In some embodiments, when no representative motion vector of the related block is available, the candidate determined according to the ATMVP technology is not added to the second motion vector candidate list. For example, when the sub-block in the related block is not available, or the sub-block in the related block uses the intra-coding mode, it is determined that there exists a sub-block with an unavailable motion vector in the related block.

In some embodiments, each candidate in the first motion vector candidate list includes motion vectors of a set of control points. When the representative motion vector of the related block of the current image block is added to the first motion vector candidate list, in order to guarantee the consistency of the data format, the representative motion vector of the related block can be inserted as the motion vector of each control point in the candidate (that is, the representative motion vector of the related block is assigned to the motion vector of each control point in the candidate).

In some embodiments, the representative motion vector of the related block of the current image block may refer to a motion vector at a center position of the related block, or another motion vector representing the related block, which is not limited here.

According to the above description of the second motion vector candidate list, when the candidate is determined according to the ATMVP technology, the related block of the current image block needs to be determined. In this disclosure, when the candidates to be added to the first motion vector candidate list are determined according to the ATMVP technology, there are two methods for determining the related block of the current image block.

In the first method, N neighboring blocks among the preset M neighboring blocks of the current image block are scanned sequentially, and a target neighboring block is determined according to a scan result, where N is smaller than M and M is smaller than or equal to 4. A related block of the current image block is determined according to the motion vector of the target neighboring block, the current image block and the reference image of the current image block.

In the second method, the M neighboring blocks of the current image block are determined according to the M candidates in the second motion vector candidate list of the current image block. The N neighboring blocks among the M neighboring blocks are scanned sequentially, and a target neighboring block is determined according to a scan result, where N is smaller than M and M is smaller than or equal to 4. A related block of the current image block is determined according to the motion vector of the target neighboring block, the current image block and the reference image of the current image block. The M candidates in the second motion vector candidate list may refer to the M neighboring blocks of the current image block.

For the description of two processes of "a target neighboring block is determined according to a scan result" and "a related block of the current image block is determined according to the motion vector of the target neighboring block, the current image block and the reference image of the current image block" in the first method and the second method, a reference can be made to the above explanation, which is not repeated here.

In an implementation manner, the method for determining the candidates to be added to the first motion vector candidate list includes determining the control point motion vector group of the neighboring blocks predicted by the affine transformation mode from neighboring blocks of the current image block in a specific scanning order, and adding each determined control point motion vector group of the neighboring block as a candidate to the first motion vector candidate list.

For example, the neighboring block predicted by the affine transformation mode means that the motion vector of the neighboring block is determined according to the candidates in the affine merge candidate list. That is, this is an affine motion model in which the candidate comes from the spatial neighboring block of the current image block that uses the affine mode. That is, the CPMV of the spatial neighboring block using the affine mode is used as the CPMVP of the current block.

For example, the control point motion vector group may include the motion vectors of the two control points of the neighboring block (for example, the upper left corner point and the upper right corner point of the neighboring block), or the motion vectors of the three control points of the neighboring block (such as the upper left corner point, the upper right corner point, and the lower left corner points of the image block), which depends on whether the four-parameter affine model or the six-parameter affine model is used.

For example, determining the control point motion vector group of the neighboring block predicted by the affine transformation mode according to a specific scanning order includes determining a control point motion vector group of a first neighboring block in the left neighboring block of the current image block according to a first scanning order, determining a control point motion vector group of a second neighboring block in the upper neighboring block of the current image block according to a second scanning order, and adding the control point motion vector group of the first neighboring block and the control point motion vector group of the second neighboring block to the first motion vector candidate list.

Figure 12:
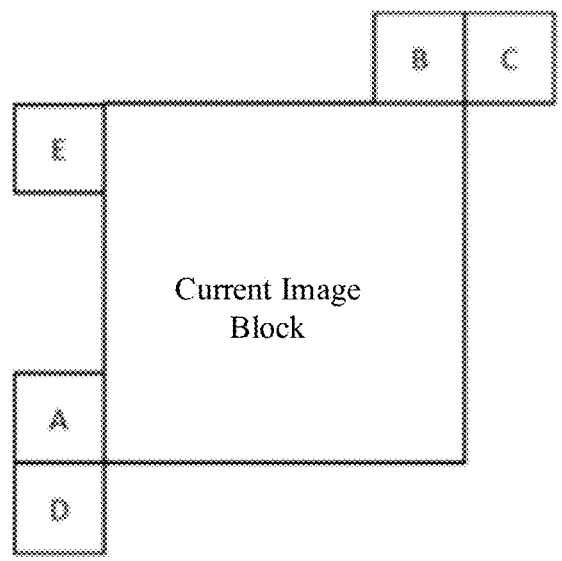
FIG. 12 is a schematic diagram showing obtaining a candidate motion vector for a first candidate list.

FIG. 12 is a schematic diagram showing obtaining candidates for the first motion vector candidate list through neighboring blocks of the current image block. A first control point motion vector group of the image block that meets a preset condition is added as a candidate to the first motion vector candidate list when a scanning is performed on the left side of the current image block according to an order of image block A→image block D→image block E. A first control point motion vector group of the image block that meets a preset condition is added as a candidate to the first motion vector candidate list when a scanning is performed in the upper side of the current image block according to an order of image block B→image block C. In some embodiments, according to the scanning orders, if an image block meeting the threshold condition is not found, then candidates are not determined according to the scanning orders.

In an implementation manner, the method for determining candidates to be added to the first motion vector candidate list includes constructing motion vectors of some of the control points according to the neighboring blocks of some of control points of the current image block, and adding the motion vectors of some of the control points of the current image block to the first motion vector candidate list.

That is, in this implementation manner, candidates are added to the first motion vector candidate list by constructing candidates. For example, before candidates are added to the first motion vector candidate list by constructing candidates, it is first determined whether a number of candidates in the first motion vector candidate list has reached a preset value (for example, 5). If the preset value is not reached, the candidates are added to the first motion vector candidate list by constructing candidates.

For example, the constructed candidate combines motion information of the neighboring blocks of some of the control points of the current image block and is added as the CPMVP to the first motion vector candidate list.

Figure 13:
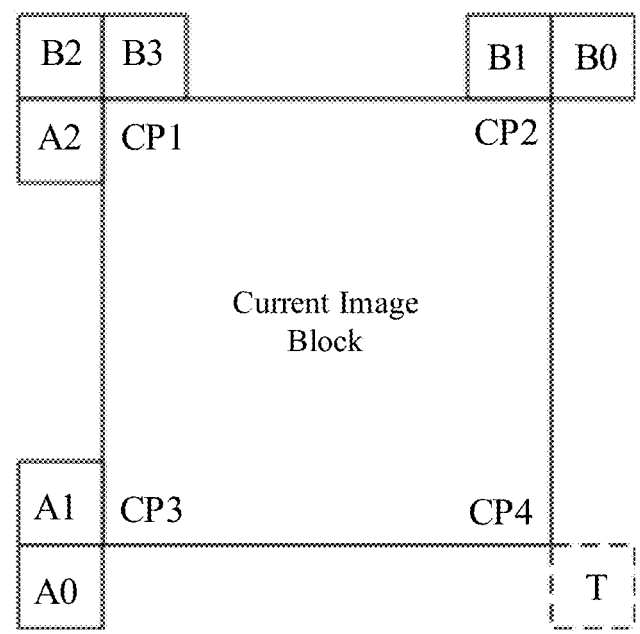
FIG. 13 is another schematic diagram showing constructing a candidate motion vector for a first candidate list.

FIG. 13 is a schematic diagram showing constructing candidates for the first motion vector candidate list through neighboring blocks of the current image block. There are four control points in the current image block, namely CP1, CP2, CP3, and CP4. The image blocks A0 and A1 are the spatial neighboring blocks of CP1, the image blocks A2, B2 and B3 are the spatial neighboring blocks of CP2, the image blocks B0 and B1 are the spatial neighboring blocks of CP2, and T is the time-domain neighboring block of CP4. The coordinates of the control points CP1, CP2, CP3 and CP4 are respectively: (0, 0), (W, 0), (H, 0) and (W, H). W and H represent the width and height of the current CU, respectively. The priority of obtaining motion information of neighboring blocks of each control point is as follows.

For CP1, the obtaining priority is B2→B3→A2. When B2 is available, the MV of B2 is used as the MV of the control point CP1. When B2 is not available, the MV of B3 is used as the MV of the control point CP1. When B2 and B3 are not available, the MV of A2 is used as the MV of the control point CP1. If B2, B3 and A2 are not available, the motion information of the control point CP1 is not available.

Similarly, for CP2, the obtaining priority is B1→B0. For CP3, the obtaining priority is A1→A0. For CP4, the MV of T is directly used as the MV of the control point CP4.

Only when all the MVs of the control points of the current CU (six-parameter model: CP0, CP1 and CP2; four-parameter model: CP0 and CP1) are available, the constructed MV is inserted, otherwise the process is skipped to the next process. After all the MVs of control points (if any) are obtained, multiple affiliate candidates can be obtained by combining the MVs of the control points in different manners. The combination method is as follows.

If the four-parameter affine model is used, one or more candidates can be obtained by combining two of the MVs of the four control points. Two of the combination methods are as follows: {CP1, CP2} and {CP1, CP3}. For the combination method {CP1, CP3}, the MVs of the selected two control points need to be converted into the MVs of the upper left and upper right control points of the current CU (CP1 and CP2) according to the four-parameter model.

If the six-parameter affine model is used, one or more candidates can be obtained by combining three of the MVs of the four control points. Four of the combination methods are as follows: {CP1, CP2, CP4}, {CP1, CP2, CP3}, {CP2, CP3, CP4}, and {CP1, CP3, CP4}. For the combination methods {CP1, CP2, CP3}, {CP2, CP3, CP4}, {CP1, CP3, CP4}, the MVs of the selected three control points need to be converted into the MVs of the upper left, upper right, and lower left control points of the current CU (CP1, CP2 and CP3) according to the six-parameter model.

For example, if the reference frames used by different combinations of Mvs (2 or 3) are not the same, the candidate constructed by the combination is considered as not available.

In an implementation manner, the method for determining candidates to be added to the first motion vector candidate list includes using a default vector for filling. In some embodiments, the default vector can be a zero vector or another vector. In some embodiments, after the candidates to be added to the first motion vector candidate list are determined according to other methods, it is determined whether the number of candidates that have been added to the first motion vector candidate list has reached a preset value. If the preset value is not reached, the default vector is filled into the first candidate list until the number of candidates in the first candidate list reaches the preset value.

When the candidate in the first motion vector candidate list is used to predict the current image block, if the candidate used is at least one candidate other than the candidates determined by the ATMVP technology, the motion vector of the sub-block in the current image block is derived according to the candidate through the affine motion model. When the candidate used is a candidate determined by ATMVP technology, according to the above description, the reference block of each sub-block in the current image block is determined according to the motion vector of each sub-block in the related block, the reference blocks of each sub-block are combined into a reference block of the current image block, and the residual of the current image block is calculated according to the reference block.

Figure 14:
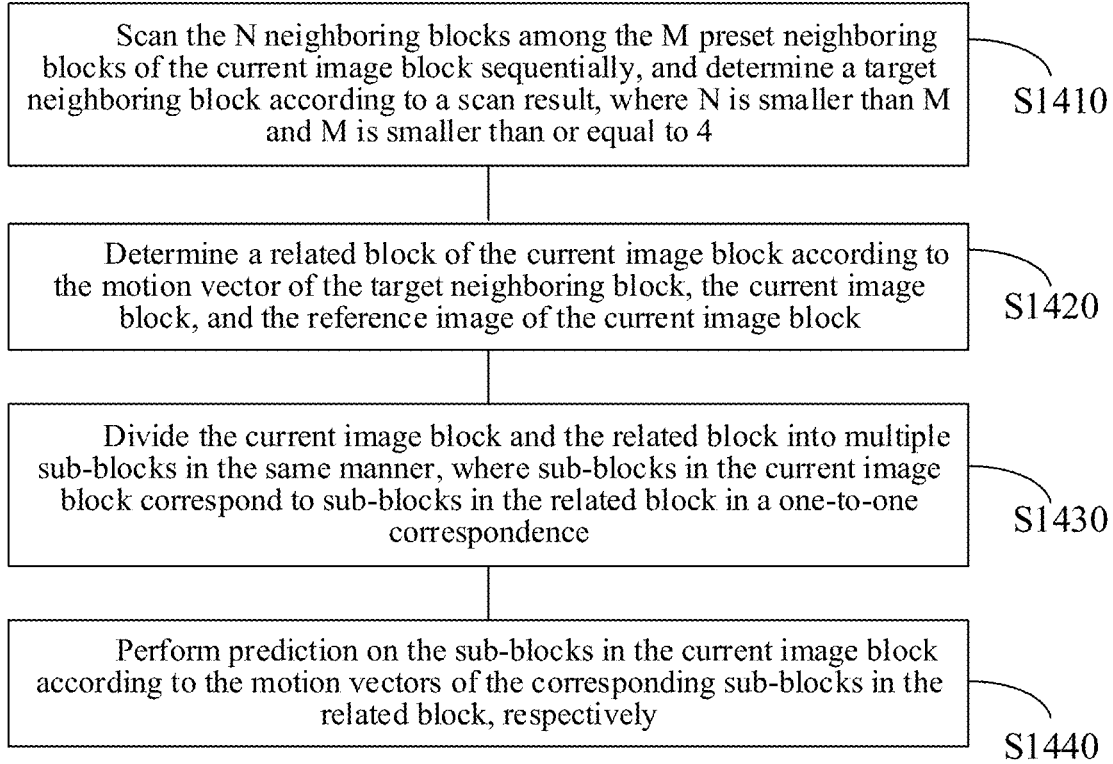
FIGS. 14 and 15 are schematic flowcharts of a video image processing method according to an embodiment of the disclosure.

Hereinafter, a video image processing method according to an embodiment of the present disclosure is described with reference to FIGS. 14 and 15. As shown in FIG. 14, at S1410, the N neighboring blocks among the M preset neighboring blocks of the current image block are scanned sequentially, and a target neighboring block is determined according to a scan result, where N is smaller than M. In some embodiments, M is smaller than or equal to 4.

At S1420, a related block of the current image block is determined according to the motion vector of the target neighboring block, the current image block, and the reference image of the current image block.

At S1430, the current image block and the related block are divided into a plurality of sub-blocks in the same manner, and sub-blocks in the current image block correspond to sub-blocks in the related block in a one-to-one correspondence.

At S1440, prediction is performed on the sub-blocks in the current image block according to the motion vectors of the corresponding sub-blocks in the related block, respectively.

For the explanation of the video image processing method shown in FIG. 14, reference can be made to the above description, which is not repeated here.

Figure 15:
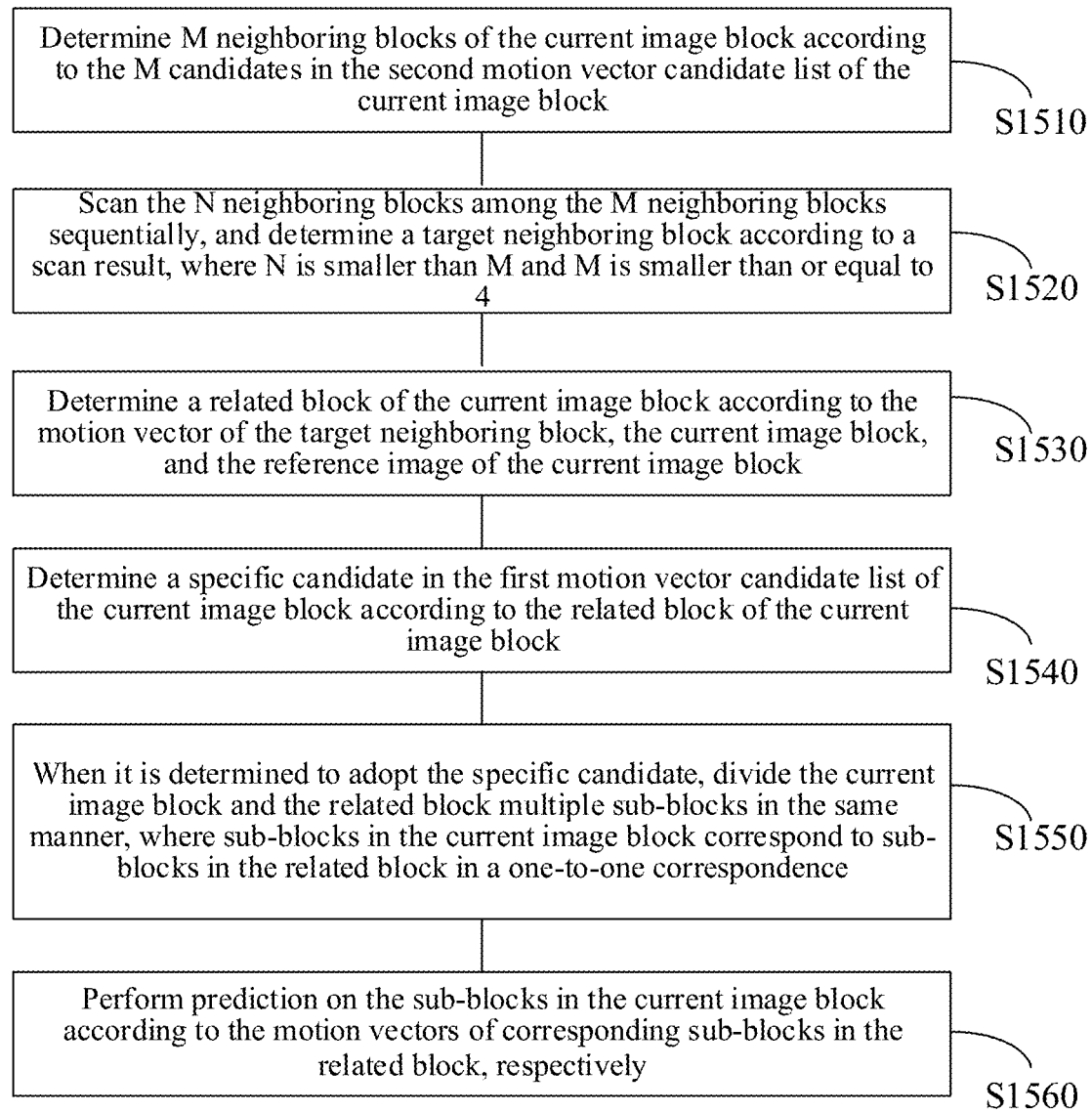

As shown in FIG. 15, at S1510, M neighboring blocks of the current image block are determined according to the M candidates in the second motion vector candidate list of the current image block.

At S1520, the N neighboring blocks among the M neighboring blocks are scanned sequentially, and a target neighboring block is determined according to a scan result, where N is smaller than M. In some embodiments, M is smaller than or equal to 4.

At S1530, a related block of the current image block is determined according to the motion vector of the target neighboring block, the current image block, and the reference image of the current image block.

At S1540, a specific candidate in the first motion vector candidate list of the current image block is determined according to the related block of the current image block. The specific candidate may be the candidate determined according to the ATMVP technology described above.

At S1550, when it is determined to adopt the specific candidate, the current image block and the related block are divided into a plurality of sub-blocks in the same manner, and sub-blocks in the current image block correspond to sub-blocks in the related block in a one-to-one correspondence.

At S1560, prediction is performed on the sub-blocks in the current image block according to the motion vectors of corresponding sub-blocks in the related block, respectively.

For the explanation of the video image processing method shown in FIG. 15, reference can be made to the above description, which is not repeated here.

Figure 16:
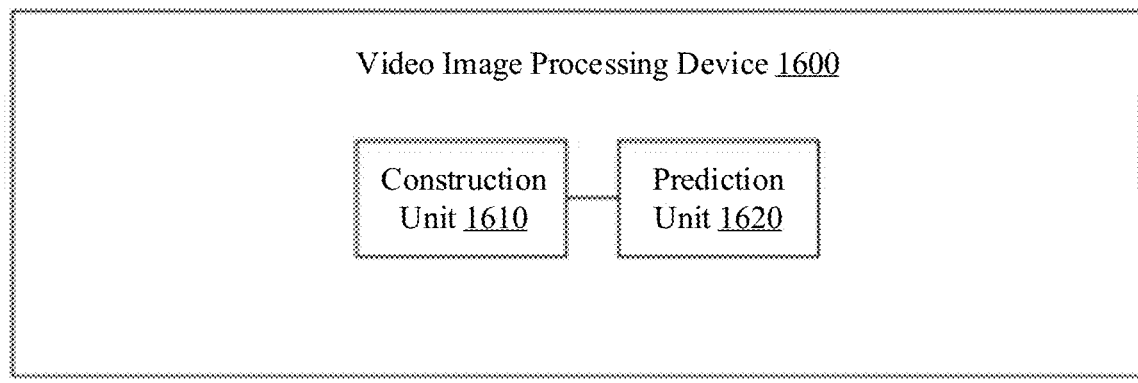
FIG. 16 is another schematic block diagram of a video image processing device according to an embodiment of the disclosure.

FIG. 16 is a schematic block diagram of a video image processing device 1600 according to an embodiment of the disclosure. The device 1600 can be used to execute, e.g., the method embodiment shown in FIG. 14. The device 1600 includes the following units.

A construction unit 1610 is configured to scan the N neighboring blocks among the M preset neighboring blocks of the current image block sequentially and determine a target neighboring block according to a scan result, where N is smaller than M, determine a related block of the current image block according to the motion vector of the target neighboring block, the current image block, and the reference image of the current image block, and divide the current image block and the related block into a plurality of sub-blocks in the same manner, where sub-blocks in the current image block correspond to sub-blocks in the related block in a one-to-one correspondence.

A prediction unit 1620 is configured to perform prediction on the sub-blocks in the current image block according to the motion vectors of corresponding sub-blocks in the related block, respectively.

In some embodiments, N is equal to 1 or 2.

In some embodiments, the prediction unit is further configured to add the representative motion vector of the related block as a candidate to the first motion vector candidate list before prediction is performed on the sub-blocks in the current image block according to the motion vectors of corresponding sub-blocks in the related block, respectively, and, when it is determined to adopt the candidate, perform prediction on the sub-blocks in the current image block according to the motion vectors of corresponding sub-blocks in the related block, respectively.

In some embodiments, performing prediction on the sub-blocks in the current image block according to the motion vectors of corresponding sub-blocks in the related block, respectively, includes using the motion vectors of the sub-blocks in the related block as the motion vectors of the corresponding sub-blocks in the current image block, respectively.

In some embodiments, the representative motion vector of the related block is added to the first motion vector candidate list as a first candidate.

In some embodiments, the representative motion vector of the related block includes a motion vector at a center position of the related block.

In some embodiments, the prediction unit is further configured to, when a sub-block with an unavailable motion vector exists in the related block, use the representative motion vector of the related block as the motion vector of the sub-block with the unavailable motion vector to predict the corresponding sub-block in the current image block.

In some embodiments, the prediction unit is further configured to, when a sub-block with an unavailable motion vector exists in the related block and no representative motion vector of the related block is available, not perform the prediction of a sub-block in the current image block according to the motion vector of corresponding sub-block in the related block.

In some embodiments, the prediction unit is further configured to, when the sub-block in the related block is not available, or the sub-block in the related block uses the intra-coding mode, determine that there exists a sub-block with an unavailable motion vector in the related block.

In some embodiments, the construction unit is further configured to determine other candidates and add the other candidates to the first motion vector candidate list, wherein at least one candidate among the other candidates includes the motion vector of the sub-block.

In some embodiments, the construction unit is further configured to, when it is determined to adopt the one candidate of the other candidates, determine the motion vector of the sub-block in the current image block according to the adopted candidate.

In some embodiments, the at least one candidate includes motion vectors of a set of control points.

In some embodiments, the prediction unit is further configured to, when it is determined to adopt a candidate among the at least one candidate, perform the affine transformation on the adopted candidate according to the affine transformation model, and perform prediction on the sub-block in the current image block according to the candidate after the affine transformation.

In some embodiments, when the affine transformation model includes a four-parameter affine transformation model, among the at least one candidate, each candidate includes motion vectors of two control points. When the affine transformation model includes a six-parameter affine transformation model, among the at least one candidate, each candidate includes motion vectors of 3 control points.

In some embodiments, the construction unit is further configured to determine the control point motion vector group of the neighboring blocks predicted by the affine transformation mode according to a specific scanning order among the neighboring blocks of the current image block, and add each determined control point motion vector group of the neighboring blocks as a candidate to the first motion vector candidate list.

In some embodiments, determining the control point motion vector group of the neighboring block predicted by the affine transformation mode according to a specific scanning order among the neighboring block of the current image block includes determining a control point motion vector group of a first neighboring block in the left neighboring block of the current image block according to a first scanning order, determining a control point motion vector group of a second neighboring block in the upper neighboring block of the current image block according to a second scanning order, and adding the control point motion vector group of the first neighboring block and the control point motion vector group of the second neighboring block to the first motion vector candidate list.

In some embodiments, the construction unit is further configured to construct motion vectors of some of the control points according to the neighboring blocks of some of control points of the current image block, and add the motion vectors of some of the control points of the current image block to the first motion vector candidate list.

In some embodiments, constructing motion vectors of some of the control points according to the neighboring blocks of some of control points of the current image block includes, for each control point of the some of the control points, scanning the specific neighboring blocks of the control point sequentially in a third scanning order, and using the motion vector of the specific neighboring block that meets a preset condition as the motion vector of the control point.

In some embodiments, the construction unit is further configured to, when the motion vectors of the some of the control points respectively point to different reference frames, not add the motion vectors of the some of the control points of the current image block to the first motion vector candidate list.

In some embodiments, when a number of candidates in the first motion vector candidate list is greater than a preset value, the motion vectors of the some of the control points of the current image block are not added to the first motion vector candidate list.

In some embodiments, the construction unit is further configured to construct a second motion vector candidate list, where the candidate added to the second motion vector candidate list is a motion vector of an image block, and, when it is confirmed that the candidate in the second motion vector candidate list is adopted, determine the motion vector of the current image block according to the motion vector of the candidate.

In some embodiments, determining the motion vector of the current image block according to the motion vector of the candidate includes using the determined adopted candidate as the motion vector of the current image block, or scaling the determined adopted candidate to be used as the motion vector of the current image block.

In some embodiments, constructing the second motion vector candidate list includes determining the candidate to be added to the second motion vector candidate list according to the motion vectors of multiple neighboring blocks of the current image block on the current image.

In some embodiments, the multiple neighboring blocks of the current image block on the current image include the preset M neighboring blocks.

In some embodiments, construction unit is further configured to sequentially use the motion vectors of the preset M neighboring blocks as M candidates according to a preset order, and add them to the second motion vector candidate list. The N neighboring blocks refer to N neighboring blocks first determined according to the preset order.

In some embodiments, construction unit is further configured to, when the motion vector of one or more neighboring blocks in the M neighboring blocks is unavailable, not determine a candidate to be added to the second motion vector candidate list according to the motion vector of the one or more neighboring blocks.

In some embodiments, scanning the N neighboring blocks among the M neighboring blocks sequentially and determining the target neighboring block according to a scan result includes scanning the N neighboring blocks sequentially, when a first neighboring block that meets the preset condition is found, stopping the scanning, and determining the target neighboring block according to the first scanned neighboring block that meets the preset condition.

In some embodiments, determining the target neighboring block according to the first scanned neighboring block that meets the preset condition includes using the first neighboring block that meets the preset condition as the target neighboring block.

In some embodiments, the preset condition includes that the reference image of the neighboring block is the same as the reference image of the current image block.

In some embodiments, the construction unit is further configured to, when no neighboring block that meets the preset condition is found among the N neighboring blocks, scale the motion vector of a specific neighboring block among the M neighboring blocks, and the prediction unit is further configured to predict the current image block according to a scaled motion vector.

In some embodiments, predicting the current image block according to a scaled motion vector includes determining the reference block of the current image block according to the scaled motion vector and the reference image of the current image block.

In some embodiments, the specific neighboring block is the first neighboring block, or the last neighboring block obtained according to a scanning order among the N neighboring blocks.

In some embodiments, scaling the motion vector of the specific neighboring block among the M neighboring blocks and predicting the current image block according to the scaled motion vector includes scaling the motion vector of the specific neighboring block to make the reference frame pointed to by the scaled motion vector the same as the reference image of the current image block, and using the image block pointed to by the scaled motion vector in the reference image of the current image block as the reference block of the current image block.

In some embodiments, when no neighboring block meeting the preset condition is found among the N neighboring blocks, a default block is used as the reference block of the current image block.

In some embodiments, the default block is an image block pointed to by a motion vector (0, 0).

In some embodiments, the size of the sub-block and/or the size of the related block of the sub-block is fixed to be greater than or equal to 64 pixels.

In some embodiments, the size of the sub-block and/or the size of the related block of the sub-block are both fixed at 8×8 pixels, or 16×4 pixels, or 4×16 pixels.

In some embodiments, in the ATMVP technology, when the size of the sub-block and/or the size of the related block of the sub-block is 8×8 pixels, or the width and/or height of the sub-block and/or the related block of the sub-block is smaller than 8 pixels, it is set not to perform the TMVP operation. Some of the redundant operation can be skipped, the encoding and decoding time can be effectively saved, and the coding efficiency can be improved.

In some embodiments, the current image block is a CU.

In some embodiments, determining the related block of the current image block according to the motion vector of the target neighboring block, the current image block, and the reference image of the current image block includes determining the related block of the current image block in the reference image of the current image block according to the motion vector of the target neighboring block.

In some embodiments, the neighboring block is an image block adjacent to or having a certain distance to the current image block on the current image.

In some embodiments, predicting the current image block according to the motion vector of the related block includes, when the reference image of the related block is the specific reference image, or when the reference image of the current image block is the specific reference image, determining the reference block of the current image block according to the processed motion vector of the related block and the reference image of the current image block.

The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, predicting the current image block according to the motion vector of the related block includes, when the reference image of the related block is the specific reference image, or when the reference image of the current block is the specific reference image, determining the reference block of the current image block without referencing to the motion vector of the related block.

In some embodiments, the construction unit is further configured to, when the motion vector of the specific neighboring block points to the specific reference image or when the reference image of the current image block is the specific reference image, determine the reference block of the current image block according to the processed motion vector of the related block and the reference image of the current image block.

The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, M is smaller than or equal to 4.

Figure 17:
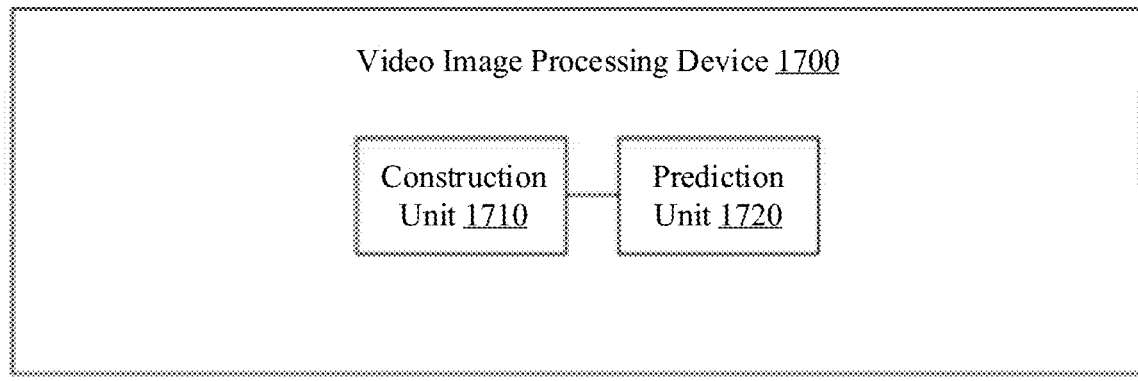
FIG. 17 is another schematic block diagram of a video image processing device according to an embodiment of the disclosure.

FIG. 17 is a schematic block diagram of a video image processing device 1700 according to an embodiment of the disclosure. The device 1700 can be used to execute, e.g., the method embodiment shown in FIG. 15. The device 1700 includes the following units.

A construction unit 1710 is configured to determine M neighboring blocks of the current image block according to the M candidates in the second motion vector candidate list of the current image block, scan the N neighboring blocks among the M neighboring blocks sequentially and determine a target neighboring block according to a scan result, where N is smaller than M, determine a related block of the current image block according to the motion vector of the target neighboring block, the current image block, and the reference image of the current image block, determine a specific candidate in the first motion vector candidate list of the current image block according to the related block of the current image block, and divide the current image block and the related block into a plurality of sub-blocks in the same manner when it is determined to adopt the specific candidate, where sub-blocks in the current image block correspond to sub-blocks in the related block in a one-to-one correspondence.

A prediction unit 1720 is configured to perform prediction on the sub-blocks in the current image block according to the motion vectors of corresponding sub-blocks in the related block, respectively.

In some embodiments, at least one candidate in the first motion vector candidate list includes a motion vector of a sub-block, and each candidate in the second motion vector candidate list includes a motion vector of an image block.

In some embodiments, N is equal to 1 or 2.

In some embodiments, the M candidates include motion vectors of M neighboring blocks of the current image block on the current image.

In some embodiments, scanning the N neighboring blocks among the M neighboring blocks sequentially and determining the target neighboring block according to a scan result includes scanning the N neighboring blocks sequentially, when a first neighboring block that meets the preset condition is found, stopping the scanning, and determining the target neighboring block according to the first scanned neighboring block that meets the preset condition.

In some embodiments, determining the target neighboring block according to the first scanned neighboring block that meets the preset condition includes using the first neighboring block that meets the preset condition as the target neighboring block.

In some embodiments, the preset condition includes that the reference image of the neighboring block is the same as the reference image of the current image block.

In some embodiments, the construction unit is further configured to, when no neighboring block that meets the preset condition is found among the N neighboring blocks, scale the motion vector of a specific neighboring block among the M neighboring blocks, and the prediction unit is further configured to predict the current image block according to a scaled motion vector.

In some embodiments, predicting the current image block according to a scaled motion vector includes determining the reference block of the current image block according to the scaled motion vector and the reference image of the current image block.

In some embodiments, the specific neighboring block is the first neighboring block, or the last neighboring block obtained according to a scanning order among the N neighboring blocks.

In some embodiments, scaling the motion vector of the specific neighboring block among the M neighboring blocks and predicting the current image block according to the scaled motion vector includes scaling the motion vector of the specific neighboring block to make the reference frame pointed to by the scaled motion vector the same as the reference image of the current image block, and using the image block pointed to by the scaled motion vector in the reference image of the current image block as the reference block of the current image block.

In some embodiments, when no neighboring block meeting the preset condition is found among the N neighboring blocks, a default block is used as the reference block of the current image block.

In some embodiments, the default block is an image block pointed to by a motion vector (0, 0).

In some embodiments, the size of the sub-block and/or the size of the related block of the sub-block is fixed to be greater than or equal to 64 pixels.

In some embodiments, the size of the sub-block and/or the size of the related block of the sub-block are both fixed at 8×8 pixels, or 16×4 pixels, or 4×16 pixels.

In some embodiments, in the ATMVP technology, when the size of the sub-block and/or the size of the related block of the sub-block is 8×8 pixels, or the width and/or height of the sub-block and/or the related block of the sub-block is smaller than 8 pixels, it is set not to perform the TMVP operation. Some of the redundant operation can be skipped, the encoding and decoding time can be effectively saved, and the coding efficiency can be improved.

In some embodiments, the current image block is a CU.

In some embodiments, determining the related block of the current image block according to the motion vector of the target neighboring block, the current image block, and the reference image of the current image block includes determining the related block of the current image block in the reference image of the current image block according to the motion vector of the target neighboring block.

In some embodiments, the neighboring block is an image block adjacent to or having a certain distance to the current image block on the current image.

In some embodiments, predicting the current image block according to the motion vector of the related block includes, when the reference image of the related block is the specific reference image, or when the reference image of the current image block is the specific reference image, determining the reference block of the current image block according to the processed motion vector of the related block and the reference image of the current image block.

The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, predicting the current image block according to the motion vector of the related block includes, when the reference image of the related block is the specific reference image, or when the reference image of the current block is the specific reference image, determining the reference block of the current image block without referencing to the motion vector of the related block.

In some embodiments, the construction unit is further configured to, when the motion vector of the specific neighboring block points to the specific reference image or when the reference image of the current image block is the specific reference image, determine the reference block of the current image block according to the processed motion vector of the related block and the reference image of the current image block.

The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, performing prediction on the sub-blocks in the current image block according to the motion vectors of corresponding sub-blocks in the related block, respectively, includes using the motion vectors of sub-blocks in the related block as the motion vectors of the corresponding sub-blocks in the current image block, respectively.

In some embodiments, determining the specific candidate in the first motion vector candidate list of the current image block according to the related block of the current image block includes adding a representative motion vector of the related block of the current image block to the first motion vector candidate list as the specific candidate.

In some embodiments, the representative motion vector of the related block is added to the first motion vector candidate list as a first candidate.

In some embodiments, the representative motion vector of the related block includes a motion vector at a center position of the related block.

In some embodiments, the prediction unit is further configured to, when a sub-block with an unavailable motion vector exists in the related block, use the representative motion vector of the related block as the motion vector of the sub-block with the unavailable motion vector to predict the corresponding sub-block in the current image block.

In some embodiments, the prediction unit is further configured to, when a sub-block with an unavailable motion vector exists in the related block and no representative motion vectors of the related block is available, not perform the prediction of a sub-block in the current image block according to the motion vector of a corresponding sub-block in the related block.

In some embodiments, the prediction unit is further configured to, when the sub-block in the related block is not available, or the sub-block in the related block uses the intra-coding mode, determine that there exists a sub-block with an unavailable motion vector in the related block.

In some embodiments, the prediction unit is further configured to, when it is determined to adopt one of the candidates in the second motion vector candidate list other than the specific candidate, perform affine transformation on the adopted candidate according to the affine transformation model, and perform prediction on the sub-block in the current image block according to the candidate after the affine transformation.

In some embodiments, among the at least one candidate in the second motion vector candidate list other than the specific candidate, each candidate includes motion vectors of a set of control points.

In some embodiments, when the affine transformation model includes a four-parameter affine transformation model, among the at least one candidate, each candidate includes motion vectors of two control points. When the affine transformation model includes a six-parameter affine transformation model, among the at least one candidate, each candidate includes motion vectors of 3 control points.

In some embodiments, the construction unit is further configured to determine the control point motion vector group of the neighboring blocks predicted by the affine transformation mode according to a specific scanning order among the neighboring blocks of the current image block, and add each determined control point motion vector group of the neighboring blocks as a candidate to the first motion vector candidate list.

In some embodiments, determining the control point motion vector group of the neighboring block predicted by the affine transformation mode according to a specific scanning order among the neighboring block of the current image block includes determining a control point motion vector group of a first neighboring block in the left neighboring block of the current image block according to a first scanning order, determining a control point motion vector group of a second neighboring block in the upper neighboring block of the current image block according to a second scanning order, and adding the control point motion vector group of the first neighboring block and the control point motion vector group of the second neighboring block to the first motion vector candidate list.

In some embodiments, the construction unit is further configured to construct motion vectors of some of the control points according to the neighboring blocks of some of control points of the current image block, and add the motion vectors of some of the control points of the current image block to the first motion vector candidate list.

In some embodiments, constructing motion vectors of some of the control points according to the neighboring blocks of some of control points of the current image block includes, for each control point of the some of the control points, scanning the specific neighboring blocks of the control point sequentially in a third scanning order, and using the motion vector of the specific neighboring block that meets a preset condition as the motion vector of the control point.

In some embodiments, the construction unit is further configured to, when the motion vectors of the some of the control points respectively point to different reference frames, not add the motion vectors of the some of the control points of the current image block to the first motion vector candidate list.

In some embodiments, when a number of candidates in the first motion vector candidate list is greater than a preset value, the motion vectors of the some of the control points of the current image block are not added to the first motion vector candidate list.

In some embodiments, the construction unit is further configured to construct a second motion vector candidate list, where the candidate added to the second motion vector candidate list is a motion vector of an image block, and, when it is confirmed that the candidate in the second motion vector candidate list is adopted, determine the motion vector of the current image block according to the motion vector of the candidate.

In some embodiments, determining the motion vector of the current image block according to the motion vector of the candidate includes using the determined adopted candidate as the motion vector of the current image block, or scaling the determined adopted candidate to be used as the motion vector of the current image block.

In some embodiments, constructing the second motion vector candidate list includes determining the M candidates to be added to the second motion vector candidate list according to the motion vectors of M neighboring blocks of the current image block on the current image.

In some embodiments, construction unit is further configured to sequentially use the motion vectors of the preset M neighboring blocks as M candidates according to a preset order, and add them to the second motion vector candidate list. The N neighboring blocks refer to N neighboring blocks first determined according to the preset order.

In some embodiments, construction unit is further configured to, when the motion vector of one or more neighboring blocks in the M neighboring blocks is unavailable, not determine a candidate to be added to the second motion vector candidate list according to the motion vector of the one or more neighboring blocks.

In some embodiments, M is smaller than or equal to 4.

Figures 18, 19:
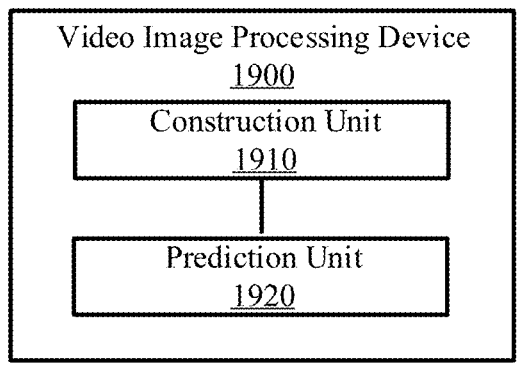
FIG. 18 is another schematic flowchart of a video image processing method according to an embodiment of the disclosure.
FIG. 19 is another schematic block diagram of a video image processing device according to an embodiment of the disclosure.

FIG. 18 is another schematic flowchart of a video image processing method 1800 according to an embodiment of the disclosure.

At S1810, a base motion vector list is determined. The base motion vector list includes at least one dual-prediction base motion vector group, and the dual-prediction base motion vector group includes a first base motion vector and a second base motion vector.

At S1820, two motion vector offsets are determined from a preset offset set. The two motion vector offsets correspond to the first base motion vector and the second base motion vector, respectively.

At S1830, the motion vector of the current image block is determined according to the first base motion vector, the second base motion vector, and the two motion vector offsets.

At S1840, a prediction is performed on the current image block according to the motion vector of the current image block.

In the video image processing method provided by the embodiments of the present disclosure, the base motion vector in the dual-prediction base motion vector group is offset according to the preset offset set, and a more accurate motion vector of the current image block can be obtained through limited calculations to make the residual error obtained by the prediction smaller, thereby improving the coding efficiency.

In some embodiments, the video image processing method of the embodiments of the present disclosure can be used to improve a merge with motion vector difference (MMVD) technology, which is also known as an ultimate motion vector expression (UMVE) technology. In particular, it is used in the MMVD technology to construct a merge candidate list (merge list), which is also known as a motion vector candidate list.

In some embodiments, before the process S1810, the video image processing method 1800 may further include obtaining a merge candidate list. The merge candidate list includes P groups of merge motion vector candidates, where P is an integer greater than or equal to 1. At S1810, determining the base motion vector list may include determining the base motion vector list according to the merge candidate list. For example, when P is greater than or equal to 2, two groups of merge motion vector candidates in the merge candidate list are taken to form the base motion vector list. In some embodiments, the two groups of merge motion vector candidates may be the first two groups of merge motion vector candidates in the merge candidate list, or may be the other two groups of merge motion vector candidates when the first two groups of merge motion vector candidates do not meet the condition. In some embodiments, the two groups of merge motion vector candidates may be any two groups of merge motion vector candidates that meet the conditions in the merge candidate list, which is not limited in the embodiments of the present disclosure. For another example, when P is smaller than 2, the base motion vector list is filled with motion vectors (0, 0).

The MMVD technology first uses the merge motion vector candidates (candidates) in the existing merge candidate list (or the various motion vector candidate lists obtained in the different types of modes described above) to construct a base motion vector list. For example, the merge motion vector candidates in the existing merge candidate list are traversed, if the number of the groups of merge motion vector candidates in the existing merge list is greater than 2, the first 2 groups of merge motion vector candidates in the merge list are taken to construct the base MVP list of MMVD. Otherwise, MV (0, 0) is used to fill the base MVP list of MMVD. In the embodiments of the present disclosure, other default motion vectors may also be used to fill the base MVP list, such as (1, 1), (2, 2), etc., which is not limited in the embodiments of the present disclosure.

Each group of base MVs of the two groups of base MVs in the base MVP list may be a unidirectional prediction base motion vector group or a dual-prediction base motion vector group. The base MVP list may include more groups or fewer groups of base MVs, which is not limited in this disclosure. In this disclosure, only the dual-prediction base motion vector group is discussed. The two base motion vectors included in the dual-prediction base motion vector group can be a forward base motion vector and a backward base motion vector, or can also be two base motion vectors in the same direction, for example, two forward base motion vectors or two backward base motion vectors.

In some embodiments, at S1820, determining two motion vector offsets from a preset offset set may include determining multiple groups of motion vector offset combination including two motion vector offsets from the offset set. At S1830, determining the motion vector of the current image block according to the first base motion vector, the second base motion vector, and the two motion vector offsets may include determining a motion vector offsets combination that makes a rate-distortion loss meet a preset condition from the multiple groups of motion vector offset combinations, and determining the motion vector of the current image block according to the first base motion vector, the second base motion vector, and the motion vector offsets combination that makes the rate-distortion loss meet the preset condition. In some embodiments, the rate-distortion loss meeting the preset condition may be that the rate-distortion loss is less than a preset threshold, or the rate-distortion loss is the smallest, for example, the prediction residual is the smallest, which is not limited in the embodiments of the present disclosure.

In the embodiments of the present disclosure, the MMVD technology can offset the prediction value of the base motion vector according to certain rules, to generate new motion vector prediction candidates as the MMVD motion vector prediction value, and put it into the MMVD motion vector candidate list. In some embodiments, the motion vector offsets in the offset set can have 8 choices $(2^1, 2^2, \ldots, 2^8)$, that is, the preset offset set is $\{2, 4, 8, 16, 32, 64, 128, 256\}$. For example, the number of groups of the base motion vector (also called the base motion vector candidate) in the base MVP list is 2, and the motion vector offset (offset) has 8 options $(2^1, 2^2, \ldots, 2^8)$. For the two components MV_x and MV_y of a group of base MVs in the base MVP list of MMVD, the motion vector offset can be added or subtracted (2 options) to or from them. For example, MMVD motion vector prediction value=base motion vector prediction value+motion vector offset. Therefore, there are 2×8×2× 2=64 refinement modes for the motion vector of the current image block of MMVD. The embodiments of the present disclosure may also select a part of 64 refinement modes, or derive more refinement modes from 64 refinement modes, and are not limited to 64 refinement modes. For example, the number of refinement modes can be 32 or 128, etc., which is not limited in the embodiments of the present disclosure. From these motion vectors, a motion vector that makes the rate-distortion loss meet the preset condition is determined as the motion vector of the current image block during encoding and/or decoding.

From another perspective, determining the motion vector that makes the rate-distortion loss meet the preset condition can also be equivalently regarded as determining a motion vector offset combination that makes the rate-distortion loss meet the preset condition from the multiple groups of motion vector offset combinations, and determine the motion vector of the current image block according to the first base motion vector, the second base motion vector, and the motion vector offset combination that makes the rate-distortion loss meet the preset condition.

The two motion vector offsets in the motion vector offset combination may be the same or different.

In some embodiments, the multiple groups of motion vector offset combinations including two motion vector offsets may be traversing the motion vector offsets in the preset offset set to form the multiple groups of motion vector offset combinations.

In some embodiments, one of the motion vector offsets in the multiple groups of motion vector offset combinations may be a motion vector offset in the offset set calculated by a preset algorithm, and the calculated motion vector offset is set as a fixed value. The motion vector offset in traversing the offset set is used as another motion vector offset in the multiple groups of motion vector offset combinations to form multiple groups of motion vector offset combinations. Performing a simple traversal to find a suitable motion vector offset combination instead of performing a scaling operation (or performing a scaling operation with a scaling ratio of 1) can reduce the amount of calculation as a whole and improve the encoding/decoding efficiency.

In some embodiments, one of the motion vector offsets in the multiple groups of motion vector offset combinations may be a motion vector offset in the offset set calculated by a preset algorithm, and the calculated motion vector offset is set as a fixed value. The fixed value is scaled to obtain another motion vector offset in the multiple groups of motion vector offset combinations to form multiple groups of motion vector offset combinations.

In some embodiments, multiple groups of motion vector offset combinations including the two motion vector offsets may also be formed in other manners, which is not limited in the embodiments of the present disclosure.

In some embodiments, when the first base motion vector and the second base motion vector both point to a non-specific reference image, the selected motion vector offset may be scaled to obtain a new motion vector offset. The first base motion vector and the second base motion vector are adjusted by the new motion vector offset. The motion vector of the current image block is determined according to the first base motion vector, the second base motion vector and the two new motion vector offsets, and the current image is predicted according to the motion vector of the current image block. In other words, in bi-bidirectional prediction, when the prediction value of the motion vector of the current image block is determined according to the MMVD technology, if the distances between the current image and the reference images of the two base motion vectors are different, the motion vector offset needs to be scaled, and then the scaled motion vector offset is added or subtracted to or from the base motion vector prediction to determine the motion vector of the current image block.

When the first base motion vector and the second base motion vector both point to a non-specific reference image, the two motion vector offsets are used to adjust the first base motion vector and the second base motion vector according to the two motion vector offsets. In some embodiments, a ratio of the distance from the current image to the reference image of the first base motion vector to the distance from the current image to the reference image of the second base motion vector is equal to a ratio of the motion vector offset used by the first base motion vector to the motion vector offset used by the second base motion vector. In other words, the scaling factor is determined by the distance between the current image block (for example, the first image block) and the reference images of the current image block in two reference directions, and these two reference images are the reference images of the current base motion vectors. This implementation can further reduce the number of motion vector offset combinations that need to be tried, and can further improve encoding/decoding efficiency.

The adjustment may be adding the two motion vector offsets to the first base motion vector and second base motion vector respectively, or the adjustment may be subtracting the two motion vector offsets from the first base motion vector and the second base motion vector respectively.

For example, in the encoding or decoding process, there are 8 options for the optional motion vector offset {2, 4, 8, 16, 32, 64, 128, 256}. The motion vector offset selected in the current process is denotes as X. The frame number of the current image is denoted as P2, the frame number of the reference image of the first base motion vector and the frame number of the reference image of the second base motion vector are denoted as P0 and P1, respectively. If P2−P0=P2−P1, a same motion vector offset X is added to the two base motion vectors. If P2−P0=2×(P2−P1), then a motion vector offset 2×X is added to the first base motion vector, and a motion vector offset X is added to the second base motion vector. Similarly, if P2−P1=2×(P2−P0), a motion vector offset X is added to the first base motion vector, and a motion vector offset 2×X is added to the second base motion vector.

Further, if the ratio of the distance from the current image to the reference image of the first base motion vector to the distance from the current image to the reference image of the second base motion vector is not a multiple of 2, then an appropriate ratio (a multiple of 2) is selected to make the ratio of the motion vector offset used by the first base motion vector to the motion vector offset used by the second base motion vector is as close as possible to the ratio of the distance between the current image and the reference image of the first base motion vector to the distance between the current image and the reference image of the second base motion vector. For example, if P2−P0=3×(P2−P1), a ratio 2 or 4 is selected. A motion vector offset 2×X is added to the first base motion vector, and a motion vector offset X is added to the second base motion vector, or, a motion vector offset 4×X is added to the first base motion vector, and a motion vector offset X is added to the second base motion vector. For another example, if P2−P0=5×(P2−P1), then a ratio 4, which is a multiple of 2 and closest to 5, is selected. A motion vector offset 4×X is added to the first base motion vector, and the motion vector offset X is added to the second base motion vector.

When the first base motion vector and/or the second base motion vector point to a specific reference image (that is, the reference image of the current image block is a specific reference image), because the definition of the temporal distance between the specific reference image and the image where the current image block is located is not clear, it may be meaningless to scale the motion vector offset.

In some embodiments, when the first base motion vector and/or the second base motion vector point to a specific reference image, at least one motion vector offset of the two motion vector offsets includes a motion vector offset obtained by scaling an initial motion vector offset according to a scaling factor of 1, or a motion vector offset obtained by skipping the scaling process.

In other words, when the first base motion vector and/or the second base motion vector point to a specific reference image, the motion vector of the current image block is determined according to the processed motion vector offset and the base motion vector group. The processed motion vector offset is the same as the motion vector offset before processing. For example, at least one motion vector offset of the two processed motion vector offsets includes a motion vector offset obtained by scaling an initial motion vector offset according to a scaling factor of 1, or, a motion vector offset obtained by skipping the scaling process.

In some embodiments, one motion vector offset (for example, offset1) of the two motion vector offsets may be calculated through a preset algorithm. When the first base motion vector points to a specific reference image, or the second base motion vector points to a specific reference image, or the first base motion vector and the second base motion vector both point to a specific reference image, another motion vector offset (for example, offset2) can be obtained by scaling offset1 according to a scaling factor of 1, or obtained by skipping the scaling process on offset1. In some embodiments, another motion vector offset (for example, offset2) may be obtained by scaling a certain initial offset according to a scaling factor of 1 or obtained by skipping the scaling process. In other words, the initial motion vector offset may be offset1 or another initial offset, which is not limited in the embodiments of the present disclosure.

In some embodiments of the present disclosure, the method is executed by the encoding end, and the method further includes encoding according to the prediction result and sending a bitstream to the decoding end. The bitstream includes an index indicating a motion vector offset combination that makes the rate-distortion loss meet a preset condition. In some embodiments, the encoding end informs the decoding end of the index of the determined motion vector offset combination, so that the decoding end is able to know the two motion vector offsets through a small amount of calculation, which can simplify the process at the decoding end. In some embodiments, when one motion vector offset of the two motion vector offsets (for example, offset1) may be calculated by a preset algorithm, the index may be a ratio of another motion vector offset (for example, offset2) to offset1.

In some embodiments of the present disclosure, the method is executed by the decoding end, and the method further includes receiving a bitstream sent by the encoding end. The bitstream includes an index used to indicate a combination of two motion vector offsets. Determining two motion vector offsets from the preset offset set includes determining the two motion vector offsets according to the index. In some embodiments, the encoding end informs the decoding end of the index of the determined motion vector offset combination, so that the decoding end is able to know the two motion vector offsets through a small amount of calculation, which can simplify the process at the decoding end. In some embodiments, when one motion vector offset of the two motion vector offsets (for example, offset1) may be calculated by a preset algorithm, the index may be a ratio of another motion vector offset (for example, offset2) to offset1.

A method embodiment of the present disclosure is described above with reference to FIG. 18, and the device embodiment corresponding to the above method embodiment is described below. The description of the device embodiment and the description of the method embodiment correspond to each other. Therefore, for the content that is not described in detail, reference can be made to the above-described method embodiment, which is not repeated here.

FIG. 19 is a schematic block diagram of a video image processing device 1900 according to an embodiment of the disclosure. The device 1900 can be used to execute the method shown in FIG. 18. The device 1900 includes the following units.

A construction unit 1910 is configured to determine a base motion vector list, where the base motion vector list includes at least one dual-prediction base motion vector group, and the dual-prediction base motion vector group includes a first base motion vector and a second base motion vector, determine two motion vector offsets from a preset offset set, where the two motion vector offsets correspond to the first base motion vector and the second base motion vector respectively, and determine the motion vector of the current image block according to the first base motion vector, the second base motion vector, and the two motion vectors offsets.

A prediction unit 1920 is configured to perform a prediction on the current image block according to the motion vector of the current image block.

The video image processing device provided by the embodiments of the present disclosure offsets the base motion vector in the dual-prediction base motion vector group according to the preset offset set, and obtains a more accurate motion vector of the current image block through limited calculations to make the residual error obtained by the prediction smaller, thereby improving the coding efficiency.

In some embodiments, the construction unit 1910 determining two motion vector offsets from a preset offset set may include the construction unit determining multiple groups of motion vector offset combinations including two motion vector offsets from the offset set. The construction unit 1910 determining the motion vector of the current image block according to the first base motion vector, the second base motion vector, and the two motion vector offsets may include the construction unit 1910 determining a motion vector offsets combination that makes a rate-distortion loss meet a preset condition from the multiple groups of motion vector offset combinations, and determining the motion vector of the current image block according to the first base motion vector, the second base motion vector, and the motion vector offsets combination that makes the rate-distortion loss meet the preset condition.

In some embodiments, the video image processing device 1900 is used at the encoding end, and the video image processing device 1900 further includes a transmitter configured to encode according to the prediction result and send a bitstream to the decoding end. The bitstream includes an index indicating a motion vector offset combination that makes the rate-distortion loss meet a preset condition.

In some embodiments, the video image processing device 1900 is used at the decoding end, and the video image processing device 1900 further includes a receiver configured to receive a bitstream sent by the encoding end. The bitstream includes an index used to indicate a combination of two motion vector offsets. The construction unit 1910 determining two motion vector offsets from the preset offset set includes determining the two motion vector offsets according to the index.

In some embodiments, when the first base motion vector and/or the second base motion vector point to a specific reference image, at least one motion vector offset of the two motion vector offsets includes a motion vector offset obtained by scaling an initial motion vector offset according to a scaling factor of 1, or a motion vector offset obtained by skipping the scaling process.

In some embodiments, when the first base motion vector and the second base motion vector both point to a non-specific reference image, the two motion vector offsets are used to adjust the first base motion vector and the second base motion vector according to the two motion vector offsets.

In some embodiments, a ratio of the distance from the current image to the reference image of the first base motion vector to the distance from the current image to the reference image of the second base motion vector is equal to a ratio of the motion vector offset used by the first base motion vector to the motion vector offset used by the second base motion vector.

In some embodiments, the construction unit 1910 is further configured to obtain a merge candidate list. The merge candidate list includes P groups of merge motion vector candidates, where P is an integer greater than or equal to 1. The construction unit 1910 determining the base motion vector list may include the construction unit 1910 determining the base motion vector list according to the merge candidate list.

In some embodiments, the construction unit 1910 determining the base motion vector list according to the merge candidate list may include, when P is greater than or equal to 2, the construction unit 1910 taking the first two groups of merge motion vector candidates in the merge candidate list to form the base motion vector list.

In some embodiments, the construction unit 1910 determining the base motion vector list according to the merge candidate list may include, when P is smaller than 2, the construction unit 1910 filling the base motion vector list with motion vectors (0, 0).

In some embodiments, the preset offset set is {2, 4, 8, 16, 32, 64, 128, 256}.

In some embodiments, the current image block is a coding unit CU.

In some embodiments, the current image block is a dual-prediction image block.

Figure 20:
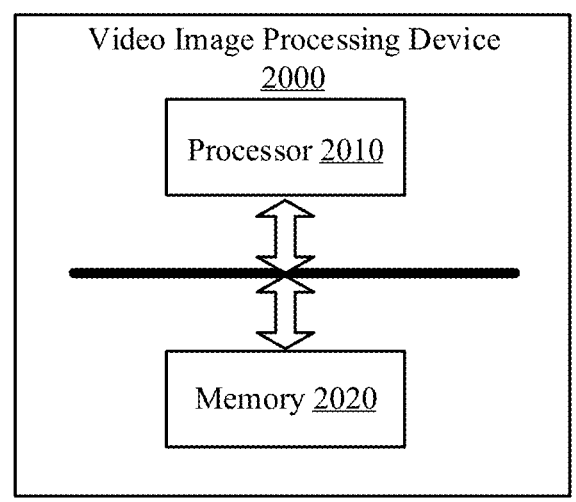
FIG. 20 is another schematic block diagram of a video image processing device according to an embodiment of the disclosure.

FIG. 20 is a schematic block diagram of a video image processing device 2000 according to an embodiment of the disclosure. As shown in FIG. 20, the video image processing device 2000 includes a processor 2010 and a memory 2020. The memory 2020 stores computer instructions. When the processor 2010 executes the computer instructions, the video image processing device 2000 determines a base motion vector list, where the base motion vector list includes at least one dual-prediction base motion vector group, and the dual-prediction base motion vector group includes a first base motion vector and a second base motion vector, determines two motion vector offsets from a preset offset set, where the two motion vector offsets correspond to the first base motion vector and the second base motion vector respectively, determines the motion vector of the current image block according to the first base motion vector, the second base motion vector, and the two motion vectors offsets, and performs a prediction on the current image block according to the motion vector of the current image block.

The video image processing device 2000 of the embodiments of the present disclosure may further include a network interface for transmitting a bitstream. For example, the bitstream sent by the encoder is received.

In some embodiments, the processor 2010 determining two motion vector offsets from a preset offset set may include determining multiple groups of motion vector offset combinations including two motion vector offsets from the offset set. The processor 2010 determining the motion vector of the current image block according to the first base motion vector, the second base motion vector, and the two motion vector offsets may include determining a motion vector offsets combination that makes a rate-distortion loss meet a preset condition from the multiple groups of motion vector offset combinations, and determining the motion vector of the current image block according to the first base motion vector, the second base motion vector, and the motion vector offsets combination that makes the rate-distortion loss meet the preset condition.

In some embodiments, the video image processing device 2000 is used at the encoding end, and the processor 2010 is further configured to encode according to the prediction result and send a bitstream to the decoding end. The bitstream includes an index indicating a motion vector offset combination that makes the rate-distortion loss meet a preset condition.

In some embodiments, the video image processing device 2000 is used at the decoding end, and the processor 2010 is further configured to receive a bitstream sent by the encoding end. The bitstream includes an index used to indicate a combination of two motion vector offsets. The processor 2010 determining two motion vector offsets from the preset offset set includes determining the two motion vector offsets according to the index.

In some embodiments, when the first base motion vector and/or the second base motion vector point to a specific reference image, at least one motion vector offset of the two motion vector offsets includes a motion vector offset obtained by scaling an initial motion vector offset according to a scaling factor of 1, or a motion vector offset obtained by skipping the scaling process.

In some embodiments, when the first base motion vector and the second base motion vector both point to a non-specific reference image, the two motion vector offsets are used to adjust the first base motion vector and the second base motion vector according to the two motion vector offsets.

In some embodiments, a ratio of the distance from the current image to the reference image of the first base motion vector to the distance from the current image to the reference image of the second base motion vector is equal to a ratio of the motion vector offset used by the first base motion vector to the motion vector offset used by the second base motion vector.

In some embodiments, the processor 2010 is further configured to obtain a merge candidate list. The merge candidate list includes P groups of merge motion vector candidates, where P is an integer greater than or equal to 1. The processor 2010 determining the base motion vector list may include determining the base motion vector list according to the merge candidate list.

In some embodiments, the processor 2010 determining the base motion vector list according to the merge candidate list may include, when P is greater than or equal to 2, taking the first two groups of merge motion vector candidates in the merge candidate list to form the base motion vector list.

In some embodiments, the processor 2010 determining the base motion vector list according to the merge candidate list may include, when P is smaller than 2, filling the base motion vector list with motion vectors (0, 0).

In some embodiments, the preset offset set is {2, 4, 8, 16, 32, 64, 128, 256}.

In some embodiments, the current image block is a coding unit CU.

In some embodiments, the current image block is a dual-prediction image block.

The video image processing device 2000 shown in FIG. 20 or the video image processing device 1900 shown in FIG. 19 can be used to perform operations or processes in the above-described method embodiments, and the operations and/or functions of the various units and devices in the video image processing device 2000 or the video image processing device 1900 are respectively intended to implement the corresponding processes in the above-described method embodiments, which are not repeated here.

A video image processing method is also provided according to an embodiment of the present disclosure and includes determining a base motion vector list, where the base motion vector list includes a base motion vector group, not determining the motion vector of the current image block according to the base motion vector group and the motion vector offset when at least one base motion vector in the base motion vector group points to a specific reference image. That is, when at least one base motion vector in the base motion vector group points to a specific reference image, the corresponding motion vector is not placed in the MV candidate list.

In some embodiments, a merge candidate list is obtained and the merge candidate list includes P groups of merge motion vector candidates, where P is an integer greater than or equal to 1. Determining the base motion vector list may include determining the base motion vector list according to the merge candidate list.

In some embodiments, determining the base motion vector list according to the merge candidate list may include, when P is greater than or equal to 2, taking the first two groups of merge motion vector candidates in the merge candidate list to form the base motion vector list.

In some embodiments, determining the base motion vector list according to the merge candidate list may include, when P is smaller than 2, filling the base motion vector list with motion vectors (0, 0).

In some embodiments, the current image block is a coding unit CU.

Accordingly, a video image processing device is also provided according to an embodiment of the present disclosure and includes a determination unit configured to determine a base motion vector list, where the base motion vector list includes a base motion vector group, and a processing unit configured to not determine the motion vector of the current image block according to the base motion vector group and the motion vector offset when at least one base motion vector in the base motion vector group points to a specific reference image.

In some embodiments, the video image processing device further include a construction unit configured to obtain a merge candidate list and the merge candidate list includes P groups of merge motion vector candidates, where P is an integer greater than or equal to 1. The determination unit is further configured to determine the base motion vector list according to the merge candidate list.

In some embodiments, the determination unit is further configured to, when P is greater than or equal to 2, take the first two groups of merge motion vector candidates in the merge candidate list to form the base motion vector list.

In some embodiments, the determination unit is further configured to, when P is smaller than 2, fill the base motion vector list with motion vectors (0, 0).

In some embodiments, the current image block is a coding unit CU.

A video image processing device is further provided according to the disclosure and includes a processor and a memory. The memory stores computer instructions. When the processor executes the computer instructions, the video image processing device determines a base motion vector list, where the base motion vector list includes a base motion vector group, and does not determine the motion vector of the current image block according to the base motion vector group and the motion vector offset when at least one base motion vector in the base motion vector group points to a specific reference image.

The devices in the embodiments of the present disclosure may be implemented based on a memory and a processor. Each memory is used to store instructions for executing the method of the embodiments of the present disclosure. The processor executes the above instructions, so that the device executes the methods in the embodiments of the present disclosure.

The processor mentioned in the embodiments of the present disclosure may be a central processing unit (CPU), a network processor (NP) or a combination of CPU and NP. The processor may further include a hardware chip. The above hardware chip can be an application specific integrated circuit (ASIC), a programmable logic device (PLD) or their combination. The PLD may be a complex programmable logic device (CPLD), a field-programmable gate array (FPGA), a generic array logic (GAL), or any combination thereof.

The memory mentioned in the embodiments of the present disclosure may be a volatile memory or a non-volatile memory, or may include both volatile and non-volatile memories. Among them, non-volatile memory can be read-only memory (ROM), programmable read-only memory (PROM), erasable programmable read-only memory (EPROM), electronically erasable programmable read-only memory (EEPROM), flash memory, hard disk drive (HHD), or solid-state drive (SSD). The volatile memory may be a random access memory (RAM), which is used as an external cache. By way of example but not limitation, many forms of RAM are available, such as static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchlink dynamic random access memory (SLDRAM)), and direct rambus random access memory (DR RAM).

When the processor is a general-purpose processor, DSP, ASIC, FPGA or other programmable logic device, discrete gate or transistor logic device, or discrete hardware component, the memory (storage module) is integrated in the processor.

The memories described here are intended to include, but are not limited to these and any other suitable types of memories.

A computer-readable storage medium is also provided in the embodiments of the present disclosure to store instructions. When the instructions are run on the computer, the computer executes the methods in the above embodiments.

A computing device is further provided in the embodiments of the present disclosure. The computing device includes the computer-readable storage medium described above.

A computer program product including instructions is further provided in the embodiments of the present disclosure. When the computer runs the computer program product, the computer executes the processes of the above method embodiments.

A computer chip is further provided in the embodiments of the present disclosure. The computer chip enables a computer to execute the processes of the above method embodiments.

The embodiments of the present disclosure can be applied to the field of aircrafts, especially unmanned aerial vehicles.

The division of circuits, sub-circuits, and sub-units in the embodiments of the present disclosure is only schematic. Those of ordinary skills in the art may realize that the circuits, sub-circuits, and sub-units of the examples described in the embodiments can be further divided or combined.

In the above embodiments, it can be implemented in whole or in part by software, hardware, firmware, or any combination thereof. When implemented using software, it can be implemented in whole or in part in the form of a computer program product. The computer program product includes one or more computer instructions. When computer instructions are loaded and executed on a computer, the processes or functions according to the embodiments of the present disclosure are generated in whole or in part. The computer may be a general-purpose computer, a special-purpose computer, a computer network, or other programmable devices. Computer instructions can be stored in a computer-readable storage medium or transmitted from one computer-readable storage medium to another computer-readable storage medium. For example, the computer instructions can be transmitted from a website, computer, server, or data center via a wired (e.g., coaxial cable, optical fiber, digital subscriber line (DSL)) or wireless (such as infrared, wireless, microwave, etc.) manner to another website, computer, server or data center. The computer-readable storage medium may be any available medium that can be accessed by a computer or a data storage device including one or more available medium integrated servers, data centers, and the like. The usable media can be magnetic media (such as floppy disks, hard disks and magnetic tapes), optical media (such as high-density digital video disks (DVD)), or semiconductor media (such as solid-state disks (SSD)).

The first, second, and various numerals involved in this disclosure are only for easy distinction for description, and are not used to limit the scope of the disclosure.

The term "and/or" in this disclosure is merely an association relationship describing the associated objects and indicates that there may be three relationships. For example, A and/or B may indicate three cases such as only A existing, both A and B existing, and only B existing. In addition, the character "/" in this disclosure generally indicates that the related objects before and after are in an "or" relationship.

In various embodiments of the present disclosure, the size of the sequence numbers of the above processes does not mean that the execution order is sequential. The execution order of each process should be determined by its function and inherent logic and should not apply any limitation to the implementation process in the embodiments of the present disclosure.

Those of ordinary skills in the art may realize that the units and algorithms described in the embodiments of the disclosure can be implemented by electronic hardware, or a combination of computer software and electronic hardware. Whether these functions are executed in hardware or software depends on the specific application of the technical solution and design constraints. Professional technicians can use different methods to implement the described functions for each specific application, but such implementation should not be considered beyond the scope of this disclosure.

Those of ordinary skills in the art can clearly understand that for the convenience and conciseness of the description, for the specific working process of the system, device and unit described above, reference can be made to the corresponding process in the foregoing method embodiments, which will not be repeated here.

In the embodiments provided in this disclosure, the disclosed system, device, and method may be implemented in other ways. For example, the device embodiments described above are only schematic. For example, the division of the units is only a division of logical functions. In actual implementation, there may be other divisions, for example, multiple units or components may be combined or integrated into another system, or some features may be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place or may be distributed on multiple network units. Some or all of the units may be selected according to actual needs to achieve the purpose of the solution of this embodiment.

In addition, each functional unit in each embodiment of the present disclosure may be integrated into one processing unit, or each unit may exist alone physically, or two or more units are integrated into one unit.

The above is only the specific implementations of this disclosure, but the scope of this disclosure is not limited to this. Any person skilled in the art can easily think of changes or replacements within the technical scope disclosed in this disclosure, which should be covered by the scope of this disclosure. Therefore, the scope of the invention shall be subject to the scope of the claims.

The invention claimed is:

1. A video encoding method comprising:
    determining a base motion vector list, the base motion vector list including a dual-prediction base motion vector group, and the dual-prediction base motion vector group including a first base motion vector and a second base motion vector;
    determining two motion vector offsets according to a preset offset set, the two motion vector offsets corresponding to the first base motion vector and the second base motion vector, respectively;
    determining motion vectors of a current image block according to the first base motion vector, the second base motion vector, and the two motion vector offsets; and
    performing prediction on the current image block according to the motion vectors of the current image block.

2. The method of claim 1, further comprising:
    encoding according to a result of the prediction to obtain a bitstream and sending the bitstream, the bitstream including an index indicating a motion vector offset.

3. The method of claim 1, wherein, in response to the first base motion vector and the second base motion vector both pointing to a non-specific reference image, the two motion vector offsets are used to adjust the first base motion vector and the second base motion vector according to the two motion vector offsets.

4. The method of claim 1, further comprising:
    obtaining a merge candidate list, the merge candidate list including P groups of merge motion vector candidates, and P being an integer greater than or equal to 1;
    wherein determining the base motion vector list includes determining the base motion vector list according to the merge candidate list.

5. The method of claim 4, wherein determining the base motion vector list according to the merge candidate list includes:
    in response to P being greater than or equal to 2, taking two groups of merge motion vector candidates in the merge candidate list to form the base motion vector list.

6. The method of claim 1, wherein the preset offset set includes {2, 4, 8, 16, 32, 64, 128}.

7. The method of claim 1, wherein the current image block includes a coding unit.

8. The method of claim 1, wherein the current image block includes a dual-prediction image block.

9. A video decoding method comprising:
    determining a base motion vector list, the base motion vector list including a dual-prediction base motion vector group, and the dual-prediction base motion vector group including a first base motion vector and a second base motion vector;
    determining two motion vector offsets according to a preset offset set, the two motion vector offsets corresponding to the first base motion vector and the second base motion vector, respectively;
    determining motion vectors of a current image block according to the first base motion vector, the second base motion vector, and the two motion vector offsets; and
    performing prediction on the current image block according to the motion vectors of the current image block.

10. The method of claim 9, further comprising:
    receiving a bitstream, the bitstream including an index indicating the two motion vector offsets;
    wherein determining the two motion vector offsets according to the preset offset set includes determining the two motion vector offsets according to the index.

11. The method of claim 9, wherein, in response to the first base motion vector and the second base motion vector both pointing to a non-specific reference image, the two motion vector offsets are used to adjust the first base motion vector and the second base motion vector according to the two motion vector offsets.

12. The method of claim 9, further comprising:
    obtaining a merge candidate list, the merge candidate list including P groups of merge motion vector candidates, and P being an integer greater than or equal to 1;
    wherein determining the base motion vector list includes determining the base motion vector list according to the merge candidate list.

13. The method of claim 12, wherein determining the base motion vector list according to the merge candidate list includes:

in response to P being greater than or equal to 2, taking two groups of merge motion vector candidates in the merge candidate list to form the base motion vector list.

14. The method of claim 9, wherein the preset offset set includes {2, 4, 8, 16, 32, 64, 128}.

15. The method of claim 9, wherein the current image block includes a coding unit.

16. The method of claim 9, wherein the current image block includes a dual-prediction image block.

17. A bitstream generating method comprising:

determining a base motion vector list, the base motion vector list including a dual-prediction base motion vector group, and the dual-prediction base motion vector group including a first base motion vector and a second base motion vector;

determining two motion vector offsets according to a preset offset set, the two motion vector offsets corresponding to the first base motion vector and the second base motion vector, respectively;

determining motion vectors of a current image block according to the first base motion vector, the second base motion vector, and the two motion vectors offsets; and encoding the current image block according to the motion vectors of the current image block to obtain a bitstream.

18. The bitstream generating method of claim 17, further comprising:

sending the bitstream, the bitstream including an index indicating a motion vector offset.

19. The bitstream generating method of claim 17, wherein, in response to the first base motion vector and the second base motion vector both pointing to a non-specific reference image, the two motion vector offsets are used to adjust the first base motion vector and the second base motion vector according to the two motion vector offsets.

20. The bitstream generating method of claim 17, further comprising:

obtaining a merge candidate list, the merge candidate list including P groups of merge motion vector candidates, and P being an integer greater than or equal to 1;

wherein determining the base motion vector list includes determining the base motion vector list according to the merge candidate list.

\* \* \* \* \*